(12) United States Patent (10) Patent No.: US 9,491,432 B2
Lin et al. (45) Date of Patent: Nov. 8, 2016

(54) VIDEO PROCESSING APPARATUS FOR GENERATING VIDEO OUTPUT SATISFYING DISPLAY CAPABILITY OF DISPLAY DEVICE ACCORDING TO VIDEO INPUT AND RELATED METHOD THEREOF

(75) Inventors: Kuan-Yi Lin, Kaohsiung County (TW); Yang-Tse Li, Hsinchu County (TW); Yu-Nien Chien, Keelung (TW)

(73) Assignee: MEDIATEK INC., Hsin-Chu (TW)

( * ) Notice: Subject to any disclaimer, the term of this patent is extended or adjusted under 35 U.S.C. 154(b) by 1049 days.

(21) Appl. No.: 12/814,515

(22) Filed: Jun. 14, 2010

(65) Prior Publication Data

US 2011/0182363 A1 Jul. 28, 2011

Related U.S. Application Data

(60) Provisional application No. 61/298,632, filed on Jan. 27, 2010.

(51) Int. Cl.
*H04N 13/00* (2006.01)
*H04N 13/02* (2006.01)

(52) U.S. Cl.
CPC ...... *H04N 13/0029* (2013.01); *H04N 13/0048* (2013.01); *H04N 13/026* (2013.01); *H04N 2213/007* (2013.01)

(58) Field of Classification Search
USPC .......................................................... 348/46
See application file for complete search history.

(56) References Cited

U.S. PATENT DOCUMENTS 6,262,763 B1 7/2001 Totsuka
6,278,418 B1 * 8/2001 Doi ................................... 345/7
6,549,243 B1 4/2003 Takashimizu
6,714,253 B2 3/2004 Cho
6,747,610 B1 6/2004 Taima
7,224,404 B2 5/2007 An
8,044,995 B2 10/2011 Matsubara
8,161,388 B2 4/2012 Rodriguez
8,325,278 B2 12/2012 Oku
8,542,241 B2 9/2013 Lee (Continued)

FOREIGN PATENT DOCUMENTS

CN 1350748 A 5/2002
CN 1882106 A 12/2006

(Continued)

OTHER PUBLICATIONS

"International Search Report" mailed on Jan. 13, 2011 for International application No. PCT/CN2010/077620, International filing date: Oct. 9, 2010.

(Continued)

*Primary Examiner* — Mohammed Jebari
(74) *Attorney, Agent, or Firm* — Winston Hsu; Scott Margo

(57) ABSTRACT

A video processing apparatus includes a video decoder, a storage device, and a video output device. The video decoder decodes an encoded video input to generate a video input with a source video format. The storage device buffers the video input generated from the video decoder. The video output device outputs a video output to a display device according to the video input buffered in the storage device. The video output has a display video format satisfying a display capability of the display device, and the source video format and the display video format are three-dimensional (3D) video formats different from each other.

2 Claims, 39 Drawing Sheets

(56) References Cited

U.S. PATENT DOCUMENTS

| | | |
|---|---|---|
| 8,593,574 B2 | 11/2013 | Ansari |
| 8,692,868 B2 | 4/2014 | Chang |
| 8,730,389 B2 | 5/2014 | Kobayashi |
| 8,755,668 B2 | 6/2014 | Uchida |
| 8,786,775 B2 | 7/2014 | Chung |
| 2002/0008906 A1* | 1/2002 | Tomita .......................... 359/462 |
| 2002/0162102 A1 | 10/2002 | Ihara |
| 2003/0018873 A1* | 1/2003 | Colpo et al. .................. 711/202 |
| 2003/0128273 A1* | 7/2003 | Matsui et al. ................... 348/51 |
| 2003/0227450 A1* | 12/2003 | Satoh et al. ..................... 345/204 |
| 2004/0090556 A1 | 5/2004 | Kamieniecki |
| 2005/0259147 A1 | 11/2005 | Nam |
| 2006/0062490 A1 | 3/2006 | Ha |
| 2006/0177123 A1* | 8/2006 | Ha ................. 382/154 |
| 2007/0097024 A1 | 5/2007 | Jung |
| 2007/0183650 A1 | 8/2007 | Lipton |
| 2008/0106550 A1* | 5/2008 | Tokumo et al. .............. 345/427 |
| 2008/0266387 A1 | 10/2008 | Krijn |
| 2008/0303832 A1 | 12/2008 | Kim |
| 2010/0039428 A1 | 2/2010 | Kim |
| 2010/0045780 A1 | 2/2010 | Kwon |
| 2010/0157024 A1 | 6/2010 | Park |
| 2010/0182404 A1 | 7/2010 | Kuno |
| 2010/0321390 A1 | 12/2010 | Kim |
| 2011/0012990 A1 | 1/2011 | Broberg |
| 2011/0032328 A1 | 2/2011 | Raveendran |
| 2011/0043614 A1 | 2/2011 | Kitazato |
| 2011/0050860 A1 | 3/2011 | Watson |
| 2011/0074934 A1 | 3/2011 | Ko |
| 2011/0090304 A1 | 4/2011 | Song |
| 2011/0096155 A1 | 4/2011 | Choo |
| 2011/0102554 A1 | 5/2011 | Saito |
| 2011/0149032 A1 | 6/2011 | Choi |
| 2011/0164110 A1 | 7/2011 | Fortin |
| 2011/0200297 A1 | 8/2011 | Oh |
| 2012/0007962 A1 | 1/2012 | Takuma |
| 2012/0033129 A1 | 2/2012 | Miura |
| 2012/0113113 A1 | 5/2012 | Hong |
| 2012/0127282 A1 | 5/2012 | Hwangbo |
| 2013/0044192 A1 | 2/2013 | Mukherjee |

FOREIGN PATENT DOCUMENTS

| | | |
|---|---|---|
| EP | 0 860 807 A2 | 8/1998 |
| EP | 0 860 807 A3 | 6/1999 |
| EP | 1 737 248 A2 | 12/2006 |
| EP | 2 124 437 A1 | 11/2009 |
| EP | 1 737 248 A3 | 6/2011 |
| TW | 200825979 | 6/2008 |
| TW | 200843479 | 11/2008 |
| TW | 200943959 | 10/2009 |
| WO | 2004066203 A2 | 8/2004 |
| WO | 2004066203 A3 | 8/2004 |
| WO | 2009077929 A1 | 6/2009 |
| WO | 2010008012 A1 | 1/2010 |

OTHER PUBLICATIONS

Hung-Der Lin et al., Title: Video Processing Apparatus for Generating Video Output Satisfying Display Capability of Display Device According to Video Input and Related Method Thereof, pending U.S. Appl. No. 13/575,608, filed Feb. 8, 2013.

* cited by examiner

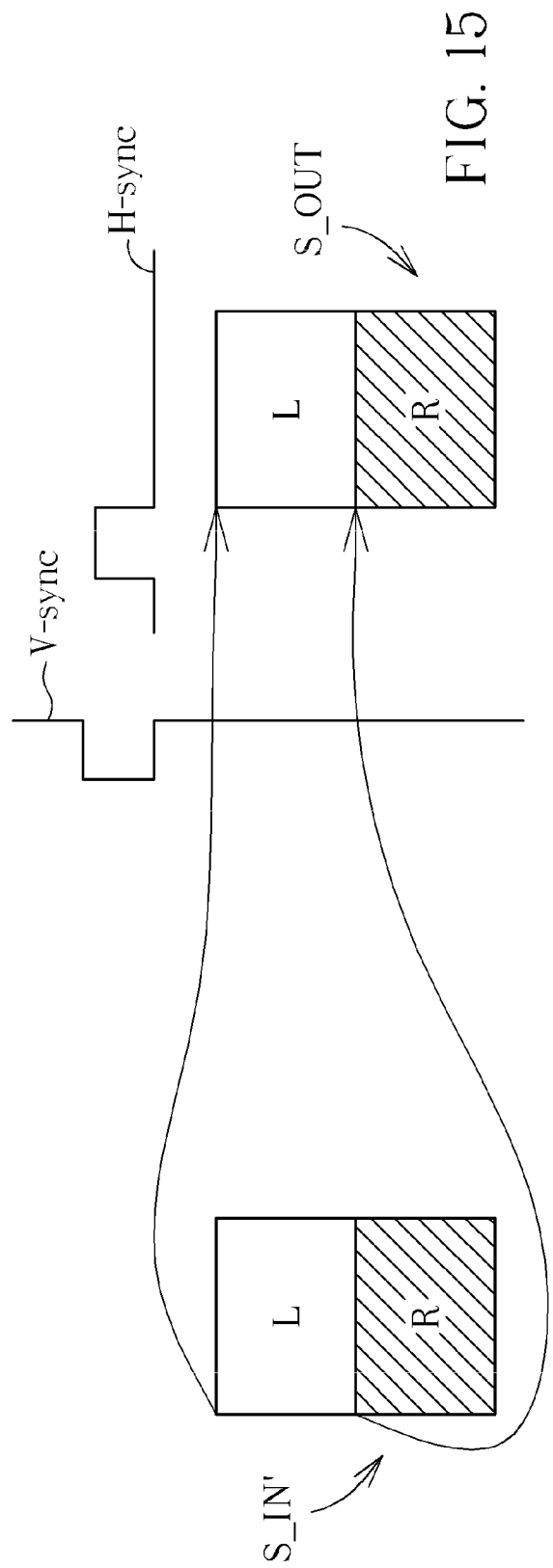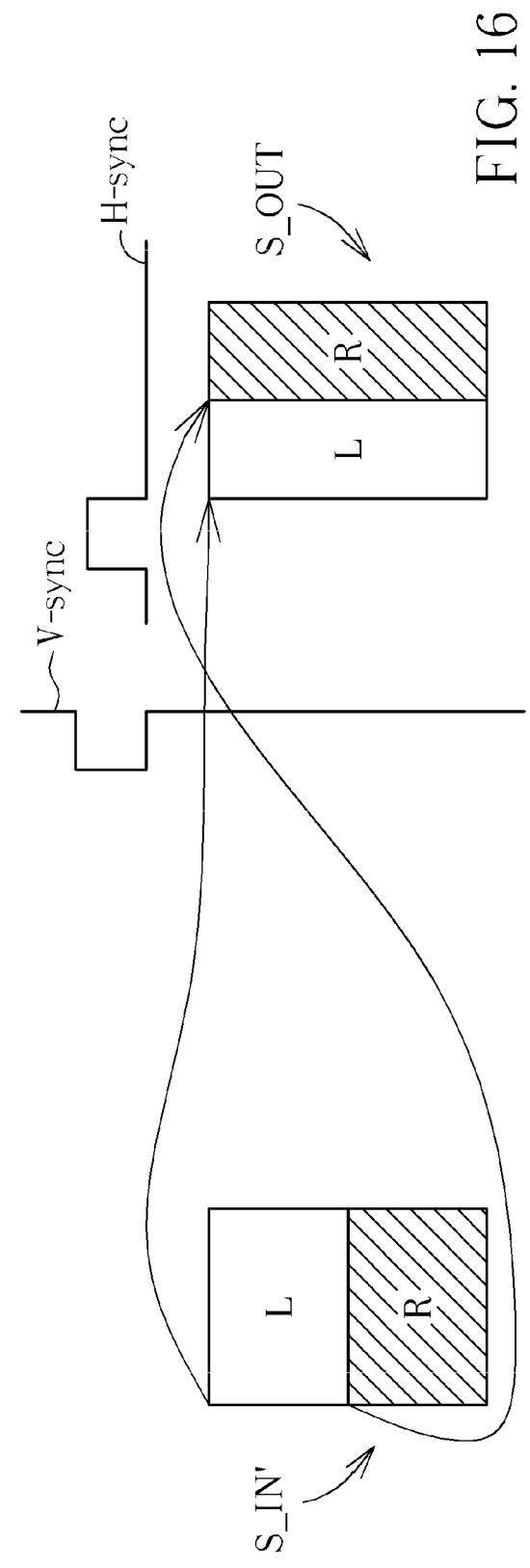

VIDEO PROCESSING APPARATUS FOR GENERATING VIDEO OUTPUT SATISFYING DISPLAY CAPABILITY OF DISPLAY DEVICE ACCORDING TO VIDEO INPUT AND RELATED METHOD THEREOF

CROSS REFERENCE TO RELATED APPLICATIONS

This application claims the benefit of U.S. Provisional Application No. 61/298,632, filed on Jan. 27, 2010 and incorporated herein by reference.

BACKGROUND

The disclosed embodiments of the present invention relate to displaying video contents on a display device, and more particularly, to a video processing apparatus for generating a video output satisfying the display capability of a display device according to a video input and related method thereof.

Three-dimensional (3D) video presentation technology is developed to improve the viewing entertainment of the end-users. For example, 3D glasses and 3D display devices are devised to realize the playback of the 3D video content. The 3D video content may be recorded using a full resolution scheme which transmits left-eye pictures and right-eye pictures by different bitstreams or may be recorded using a half resolution scheme which transmits a left-eye picture and a right-eye picture in each frame of a single bitstream. For example, the 3D video content may be recorded using a frame/field sequential format, a side-by-side format, a line-by-line format, a top-and-bottom format, or a checker sampling format when either of the full resolution scheme and the half resolution scheme is employed.

Consider a case where a 3D display device is available and supports a display video format such as one of the aforementioned 3D video formats, but the video bitstream provided from a video source complies with a source video format such as the other of the aforementioned 3D video formats. As the display video format is different from the source video format, the 3D display device fails to properly display the 3D video content transmitted by the video bitstream when driven by a video output device according to a video output with the source video format. Consequently, there is no 3D effect perceived by the user though the video source can provide the 3D video content.

Therefore, there is a need for a format conversion used to make the 3D display device properly display the 3D video content when there is a discrepancy between the source video format and the display video format.

SUMMARY

In accordance with exemplary embodiments of the present invention, a video processing apparatus for generating a video output satisfying the display capability of a display device according to a video input and related method thereof are proposed to solve the above-mentioned problem.

According to a first aspect of the present invention, an exemplary video processing apparatus is disclosed. The exemplary video processing apparatus includes a video decoder, a storage device, and a video output device. The video decoder decodes an encoded video input to generate a video input with a source video format. The storage device is coupled to the video decoder, and buffers the video input generated from the video decoder. The video output device is coupled to the storage device, and outputs a video output to a display device according to the video input buffered in the storage device. The video output has a display video format satisfying a display capability of the display device, and the source video format and the display video format are three-dimensional (3D) video formats different from each other.

According to a second aspect of the present invention, an exemplary video processing method is disclosed. The exemplary video processing method includes the following steps: decoding an encoded video input to generate a video input with a source video format; buffering the video input generated from the video decoder; and outputting a video output to a display device according to the buffered video input. The video output has a display video format satisfying a display capability of the display device, and the source video format and the display video format are three-dimensional (3D) video formats different from each other.

According to a third aspect of the present invention, an exemplary video processing apparatus is disclosed. The exemplary video processing apparatus includes a video decoder, a first storage device, a storage control device, and a video output device. The video decoder decodes an encoded video input to generate a first video input with a source video format. The storage control device is coupled between the video decoder and the first storage device, and generates a second video input with a display video format to the first storage device according to the first video input with the source video format. The video output device is coupled to the first storage device, and outputs a video output to a display device according to the second video input buffered in the first storage device. The video output has the display video format satisfying a display capability of the display device, and the source video format and the display video format are three-dimensional (3D) video formats different from each other According to a fourth aspect of the present invention, an exemplary video processing method is disclosed. The exemplary video processing method includes the following steps: decoding an encoded video input to generate a first video input with a source video format; generating a second video input with a display video format to a first storage device according to the first video input with the source video format; and outputting a video output to a display device according to the second video input buffered in the first storage device. The video output has the display video format satisfying a display capability of the display device, and the source video format and the display video format are three-dimensional (3D) video formats different from each other.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 15 is a diagram illustrating an exemplary data scanning operation for generating the video output with the top-and-bottom format according to the video input with the top-and-bottom format.

FIG. 16 is a diagram illustrating an exemplary data scanning operation for generating the video output with the side-by-side format according to the video input with the top-and-bottom format.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The conception of the present invention is to perform a video format conversion for generating a video output satisfying the display capability of a display device when a source video format of a video input is different from a display video format supported by the display device. For example, the required video format conversion may be accomplished by a video output device which is used to generate the video input to the display device, or accomplished by a storage control device disposed between a preceding video decoder and a following display output device. In this way, an optimized display quality of the video playback (e.g., 3D video playback) can be achieved. By way of example, but not limitation, the source video format of the video input may be one of the frame/field sequential format, the side-by-side format, the line-by-line format, the top-and-bottom format, and the checker sampling format due to the full resolution scheme or the half resolution scheme, and the display video format supported by the display device may be one of the frame/field sequential format, the side-by-side format, the line-by-line format, the top-and-bottom format, and the checker sampling format due to the full resolution scheme or the half resolution scheme.

Figure 1:
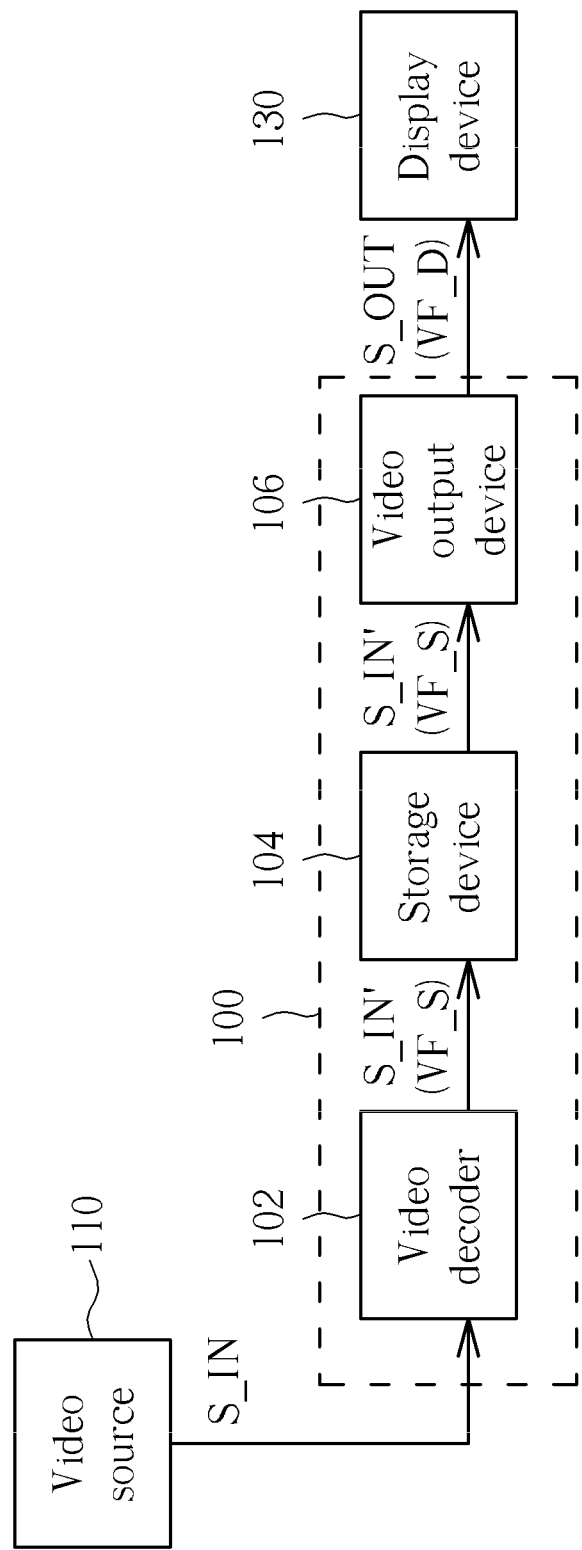
FIG. 1 is a diagram illustrating a video processing apparatus according to a first exemplary embodiment of the present invention.

FIG. 1 is a diagram illustrating a video processing apparatus according to a first exemplary embodiment of the present invention. The exemplary video processing apparatus 100 includes, but is not limited to, a video decoder 102, a storage device 104, and a video output device 106. As shown in FIG. 1, a video input S_IN' is generated from the video decoder 102 which decodes an encoded video input S_IN provided by a video source 110 such as an optical disc. In other words, the encoded video input S_IN provided by the video source 110 has encoded pictures, and the video input S_IN' generated from the video decoder 102 contains reconstructed/decoded pictures to be displayed. Therefore, the video input S_IN' derived from decoding the encoded video input S_IN has a source video format VF_S. The storage device 104 may be implemented using a dynamic random access memory (DRAM), and is used to buffer the video input S_IN' generated from the video decoder 102. The video output device 106 is coupled to the storage device 104, and is implemented for outputting a video output S_OUT to a display device (e.g., a 3D display device) 130 according to the video input S_IN' buffered in the storage device 104.

In one exemplary embodiment of the present invention, the video processing apparatus 100 may be disposed in a video playback device (e.g., an optical disc player or a set-top box) external to the display device 130, and the video processing apparatus 100 is therefore coupled to the display device 130 through a connection cable such as a high-definition multimedia interface (HDMI) cable. However, this is for illustrative purposes only. In an alternative design, the video processing apparatus 100 and the display device 130 may be integrated within a single electronic device.

Figure 2:
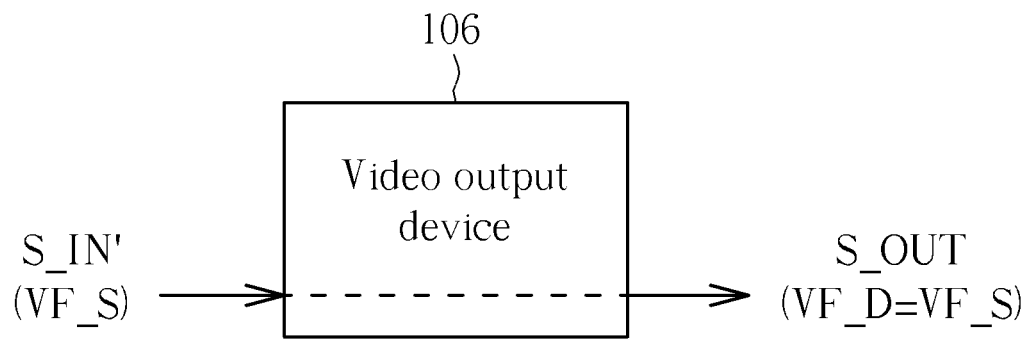
FIG. 2 is a diagram illustrating a first playback scenario of a video input.

Please refer to FIG. 2, which is a diagram illustrating a first playback scenario of the video input S_IN'. When the video input S_IN' is a 3D video with the source video format VF_S, and the display device 130 is a 3D display device supporting the display video format VF_D identical to the source video format VF_S, the video output device 106 is blocked from performing any video format conversion upon the video input S_IN'. Therefore, the video input S_IN' is bypassed and directly serves as the video output S_OUT transmitted to the display device 130 which is a 3D display device.

The video input S_IN' which is a 3D video may have a video format being one of a plurality of 3D video formats including the frame/field sequential format, the side-by-side format, the line-by-line format, the top-and-bottom format, and the checker sampling format. In addition, the display device 130 which is a 3D display device may be configured to support a video format being one of the above-mentioned 3D video formats. If the 3D video format of the video input S_IN' is identical to the 3D video format supported by the display device 130, no format conversion from one 3D video format to another 3D video format is required, as shown in FIG. 2. However, if the 3D video format of the video input S_IN' is not identical to the 3D video format supported by the display device 130, a format conversion from one 3D video format to another 3D video format is necessitated for normal video content playback.

Figure 3:
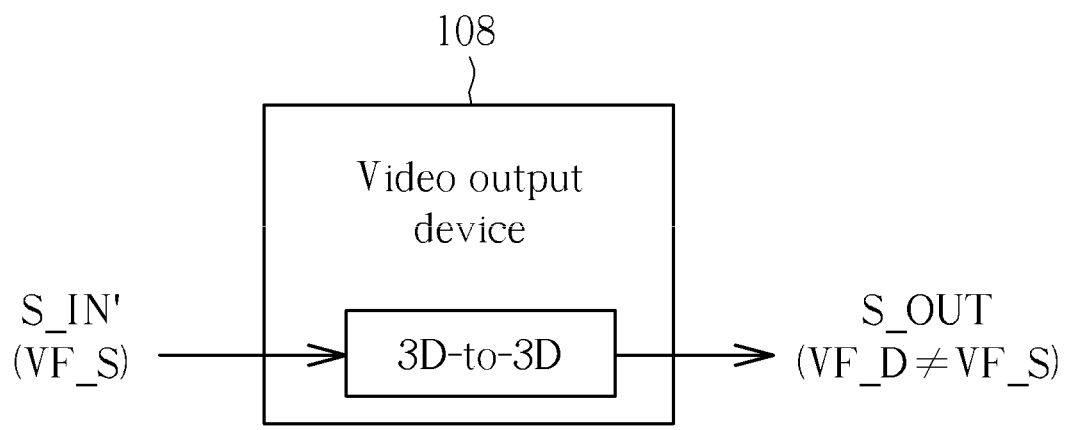
FIG. 3 is a diagram illustrating a second playback scenario of the video input.

Please refer to FIG. 3, which is a diagram illustrating a second playback scenario of the video input S_IN'. When the video input S_IN' is a 3D video with the source video format VF_S, and the display device 130 is a 3D display device supporting the display video format VF_D different from the source video format VF_S, the video output device 106 therefore enables a 3D-to-3D conversion for processing the video input S_IN' with the source video format VF_S to generate a 3D video with the display video format VF_D, wherein the generated 3D video serves as the video output S_OUT transmitted to the display device 130 which is a 3D display device. To put it simply, when the video input S_IN' has the source video format VF_S different from the display video format VF_D supported by the display device 130 (e.g., the source video format VF_S and the display video format VF_D are 3D video formats different from each other), the video output device 106 generates and outputs the video output S_OUT with the display video format VF_D satisfying the display capability of the display device 130. As a result, the output of the display device 130 allows the viewer to have the 3D viewing experience though the original video input S_IN' has a video format not complying with the display capability of the display device 130.

Figure 4:
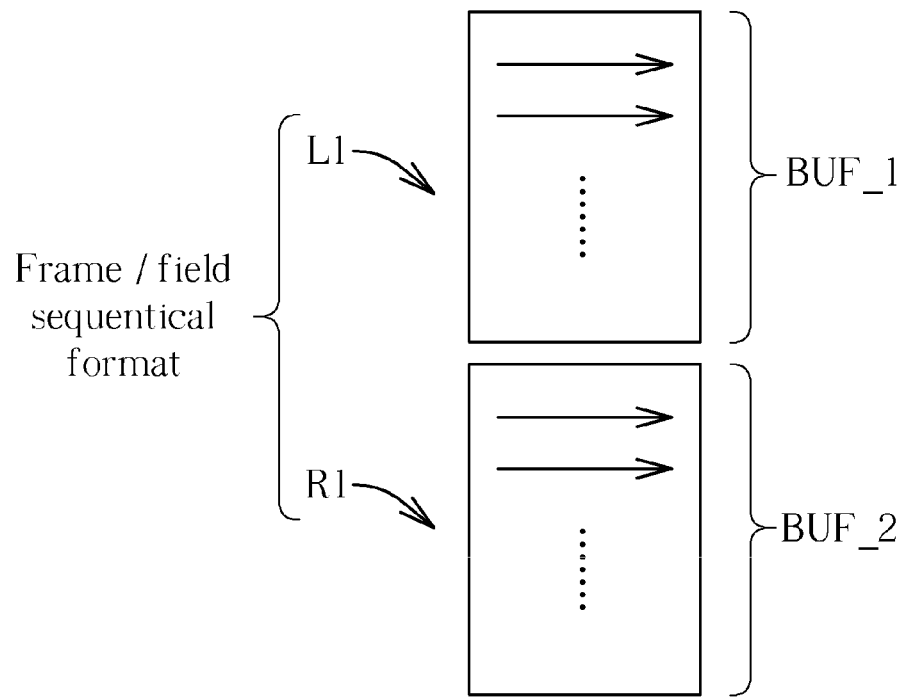
FIG. 4 is a diagram illustrating the storage arrangement for the video input with the frame/field sequential format.
Figure 5:
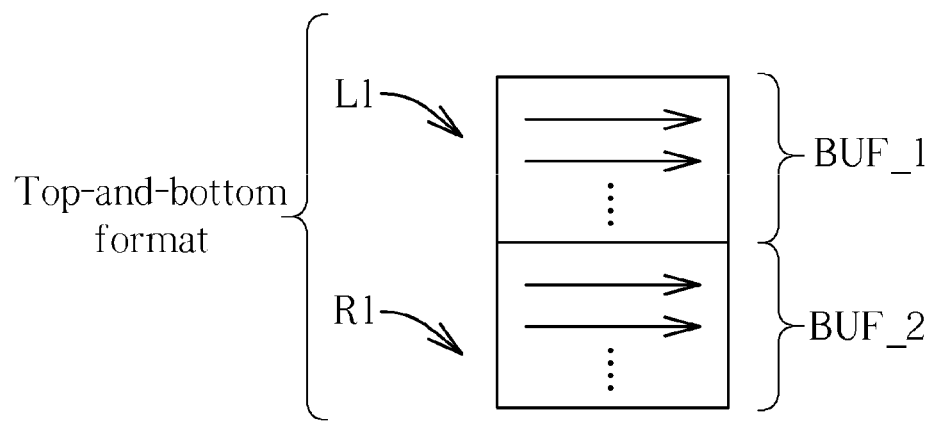
FIG. 5 is a diagram illustrating the storage arrangement for the video input with the top-and-bottom format.

Regarding the playback scenarios shown in FIG. 2 and FIG. 3, the video output device 106 has to receive data of the video input S_IN' which is a 3D video and generate data of the video output S_OUT to the display device 130 which is a 3D display device. When the source video format VF_S of the video input S_IN' is one of the aforementioned 3D video formats, data of the left-eye picture L1 and data of the right-eye picture R1 of the video input S_IN' are respectively stored in a first buffer BUF_1 and a second buffer BUF_2 allocated in the storage device 104 according to a scan line mode or a block mode. The storage arrangement for the video input S_IN' with the frame/field sequential format is identical to that of the video input S_IN' with the top-and-bottom format. For example, regarding each of the storage arrangement for the video input S_IN' with the frame/field sequential format and the storage arrangement for the video input S_IN' with the top-and-bottom format, data of the right-eye picture R1 is stored into the second buffer BUF_2 only after data of the left-eye picture L1 is stored into the first buffer BUF_1, as shown in FIG. 4 and FIG. 5. The data storage order is indicated by the arrow symbols in FIG. 4 and FIG. 5. It should be noted that the left-eye picture L1 and the right-eye picture R1 are continuously stored into the first buffer BUF_1 and the second buffer BUF_2 when the video input S_IN' has the top-and-bottom format.

Figure 6:
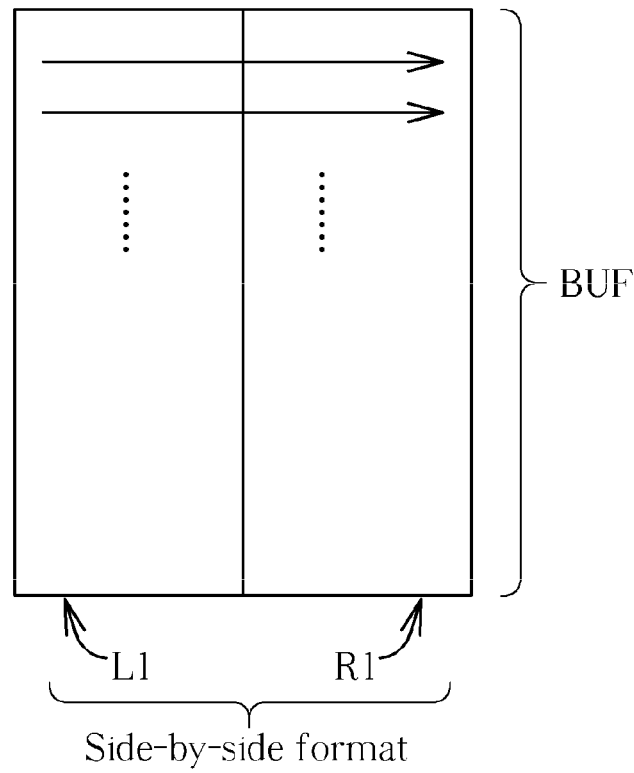
FIG. 6 is a diagram illustrating the storage arrangement for the video input with the side-by-side format.
Figure 7:
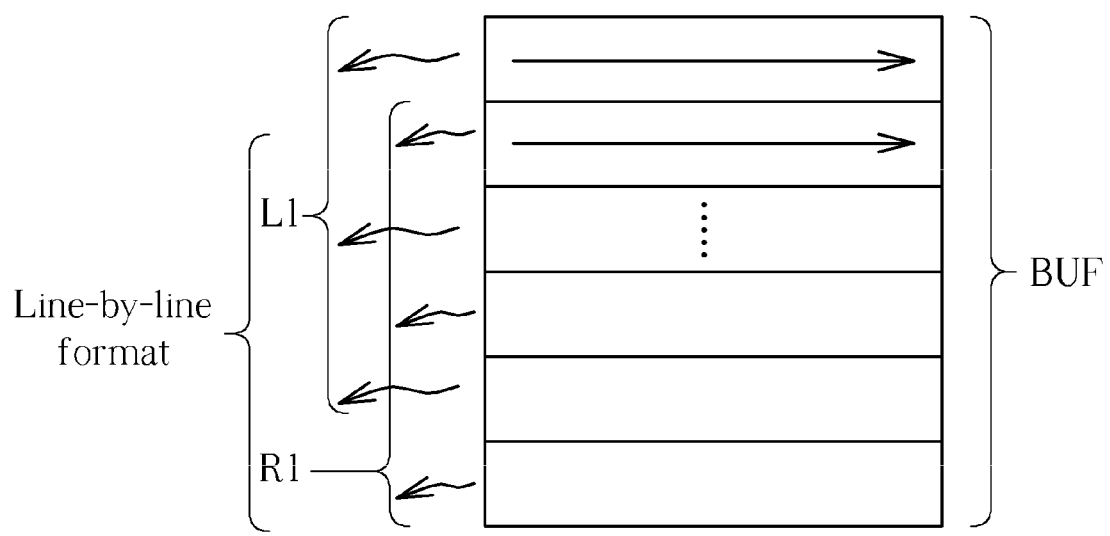
FIG. 7 is a diagram illustrating the storage arrangement for the video input with the line-by-line format.

In addition, when the source video format VF_S of the video input S_IN' is one of the side-by-side format, the line-by-line format, and the checker sampling format, data of the left-eye picture L1 and data of the right-eye picture R1 of the video input S_IN' are both stored in the same buffer BUF allocated in the storage device 104. It should be noted that the storage arrangement for the video input S_IN' with the side-by-side format is identical to that of the video input S_IN' with the line-by-line format. For example, regarding each of the storage arrangement for the video input S_IN' with the side-by-side format and the storage arrangement for the video input S_IN' with the line-by-line format, partial data of the left-eye picture L1 and partial data of the right-eye picture R1 are alternately stored into the buffer BUF until all of the left-eye picture L and right-eye picture R are stored in the buffer BUF, as shown in FIG. 6 and FIG. 7. Similarly, the data storage order is indicated by the arrow symbols in FIG. 6 and FIG. 7.

No matter how the video input S_IN' generated from the video decoder 102 is stored in the buffer(s) allocated in the storage device 104, the video output device 106 is required to properly read the buffered video input S_IN' for generating the video output S_OUT with the display video format VF_D supported by the display device 130. Please refer to FIG. 8, which is a diagram illustrating a first exemplary implementation of the video output device shown in FIG. 1. The video output device 800 includes a first display module 802 and a second display module 804 acting as video output circuits. The first display module 802 and the second display module 804 are configured to simultaneously access buffer(s). That is, each of the first display module 802 and the second display module 804 can access one buffer in one data scanning clock period. Please refer to FIG. 9, which is a diagram illustrating a second exemplary implementation of the video output device shown in FIG. 1. The video output device 900 includes a display module 902 acting as a video output circuit. In one embodiment, the display module 902 may access buffer(s) in an alternate manner. That is, the display module 902 can access a buffer in one data scanning clock period, and access the same buffer or another buffer in another data scanning clock period. In another embodiment, the display module 902 may be devised to randomly access buffer(s). That is, in each data scanning clock period, the display module 902 can access any desired data stored in the buffer(s). The operations of the video output devices 800 and 900 are summarized as follows.

Consider a first case where the source video format VF_S is one of the frame/field sequential format and the top-and-bottom format, and the video input S_IN' has a first input picture and a second input picture corresponding to different views and respectively stored in a first buffer and a second buffer allocated in the storage device 104 (e.g., left-eye picture L and right-eye picture R respectively stored in buffers BUF_1 and BUF_2 as shown in FIG. 4/FIG. 5); and the display video format VF_D is one of the frame/field sequential format and the top-and-bottom format, and the video output S_OUT has a first output picture and a second output picture corresponding to different views. The video output device 106 shown in FIG. 1 may be realized by the video output device 900 shown in FIG. 9, where the display module 902 can access one buffer in one data scanning clock period only. Therefore, the display module 902 alternately reads data from the first input picture stored in the first buffer and reads data from the second input picture stored in the second buffer, and accordingly obtains a first video data and a second video data; outputs the first output picture according to the first video data; and outputs the second output picture according to the second video data.

Consider a second case where the source video format VF_S is one of the frame/field sequential format and the top-and-bottom format, and the video input S_IN' has a first input picture and a second input picture corresponding to different views and respectively stored in a first buffer and a second buffer allocated in the storage device 104 (e.g., left-eye picture L and right-eye picture R respectively stored in buffers BUF_1 and BUF_2 as shown in FIG. 4/FIG. 5); and the display video format VF_D is one of the frame/field sequential format, the top-and-bottom format, the side-by-side format, the line-by-line format, and the checker sampling format, and the video output S_OUT has a first output picture and a second output picture corresponding to different views. The video output device 106 shown in FIG. 1 may be realized by the video output device 800 shown in FIG. 8, where the first display module 802 and the second display module 804 can simultaneously access different buffers in one data scanning clock period. Therefore, the first display module 802 reads data from the first buffer in which the first input picture is stored and accordingly obtains a first video data, and outputs the first output picture according to the first video data. In addition, the second display module 804 reads data from the second buffer in which the second input picture is stored and accordingly obtains a second video data, and outputs the second output picture according to the second video data, where the first display module 802 reads the first buffer and the second display module 804 reads the second buffer, simultaneously.

Consider a third case where the source video format VF_S is one of the frame/field sequential format and the top-and-bottom format, and the video input S_IN' has a first input picture and a second input picture corresponding to different views and respectively stored in a first buffer and a second buffer allocated in the storage device 104 (e.g., left-eye picture L and right-eye picture R respectively stored in buffers BUF_1 and BUF_2 as shown in FIG. 4/FIG. 5); and the display video format VF_D is one of the frame/field sequential format, the top-and-bottom format, the side-by-side format, the line-by-line format, and the checker sampling format, and the video output S_OUT has a first output picture and a second output picture corresponding to different views. The video output device 106 shown in FIG. 1 may be realized by the video output device 900 shown in FIG. 9, where the display module 902 can randomly access the different buffers in each data scanning clock period. Therefore, the display module 902 performs a random access upon the first buffer and the second buffer for reading data from the first buffer in which the first input picture is stored and accordingly obtaining a first video data, reading data from the second buffer in which the second input picture is stored and accordingly obtaining a second video data, outputting the first output picture according to the first video data, and outputting the second output picture according to the second video data.

Consider a fourth case where the source video format VF_S is one of the side-by-side and the line-by-line format, and the video input S_IN' has a first input picture and a second input picture corresponding to different views and both stored in a buffer allocated in the storage device 104 (e.g., left-eye picture L and right-eye picture R respectively stored in the same buffer BUF as shown in FIG. 6/FIG. 7); and the display video format VF_D is one of the frame/field sequential format and the top-and-bottom format, and the video output S_OUT has a first output picture and a second output picture corresponding to different views. The video output device 106 shown in FIG. 1 may be realized by the video output device 900 shown in FIG. 9, where the display module 902 can access one buffer in one data scanning clock period only. Therefore, the display module 902 alternately reads data from the first input picture stored in the buffer and reads data from the second input picture stored in the buffer, and accordingly obtains a first video data and a second video data; outputs the first output picture according to the first video data; and outputs the second output picture according to the second video data.

Consider a fifth case where the source video format VF_S is one of the side-by-side format and the line-by-line format, and the video input S_IN' has a first input picture and a second input picture corresponding to different views and both stored in a buffer allocated in the storage device 104 (e.g., left-eye picture L and right-eye picture R respectively stored in the same buffer BUF as shown in FIG. 6/FIG. 7); and the display video format VF_D is one of the frame/field sequential format, the top-and-bottom format, the side-by-side format, the line-by-line format, and the checker sampling format, and the video output S_OUT has a first output picture and a second output picture corresponding to different views. The video output device 106 shown in FIG. 1 may be realized by the video output device 800 shown in FIG. 8, where the first display module 802 and the second display module 804 can simultaneously access the buffer in one data scanning clock period. Therefore, the first display module 802 reads data from the first input picture stored in the buffer and accordingly obtains a first video data, and outputs the first output picture according to the first video data. In addition, the second display module 804 reads data from the second input picture stored in the same buffer and accordingly obtains a second video data, and outputs the second output picture according to the second video data, wherein the first display module 802 reads data from the first input picture stored in the buffer and the second display module 804 reads data from the second input picture stored in the buffer, simultaneously.

Consider a sixth case where the source video format VF_S is one of the side-by-side format, the line-by-line format, and the checker sampling format, and the video input S_IN' has a first input picture and a second input picture corresponding to different views and both stored in a buffer allocated in the storage device 104 (e.g., left-eye picture L and right-eye picture R respectively stored in the same buffer BUF as shown in FIG. 6/FIG. 7); and the display video format VF_D is one of the frame/field sequential format, the top-and-bottom format, the side-by-side format, the line-by-line format, and the checker sampling format, and the video output S_OUT has a first output picture and a second output picture corresponding to different views. The video output device 106 shown in FIG. 1 may be realized by the video output device 900 shown in FIG. 9, where the display module 902 can randomly access the buffer in each data scanning clock period. Therefore, the display module 902 performs a random access upon the buffer for reading data from the first input picture stored in the buffer and reading data from the second input picture stored in the same buffer, and accordingly obtaining a first video data and a second video data; outputting the first output picture according to the first video data; and outputting the second output picture according to the second video data.

For better understanding of the technical features of the present invention, several exemplary data scanning operations for generating the desired video output S_OUT are illustrated using accompanying figures.

Figure 9:
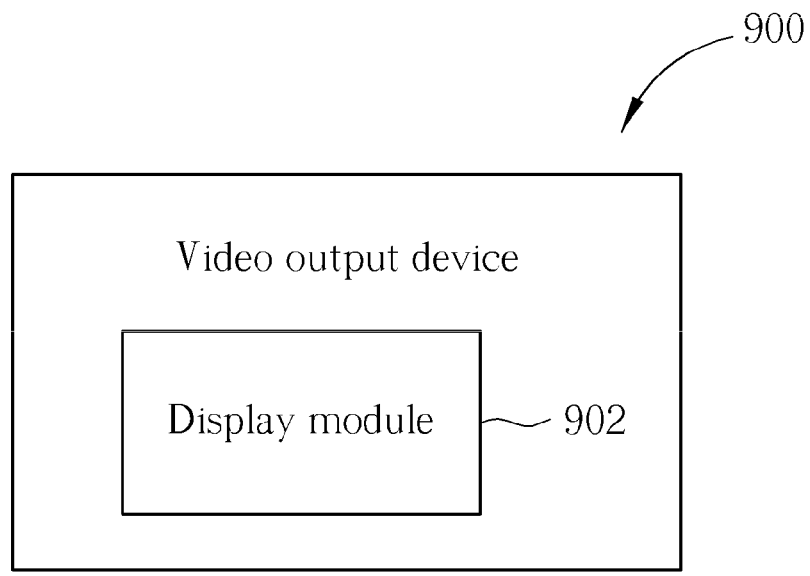
FIG. 9 is a diagram illustrating a second exemplary implementation of the video output device shown in FIG. 1.
Figure 10:
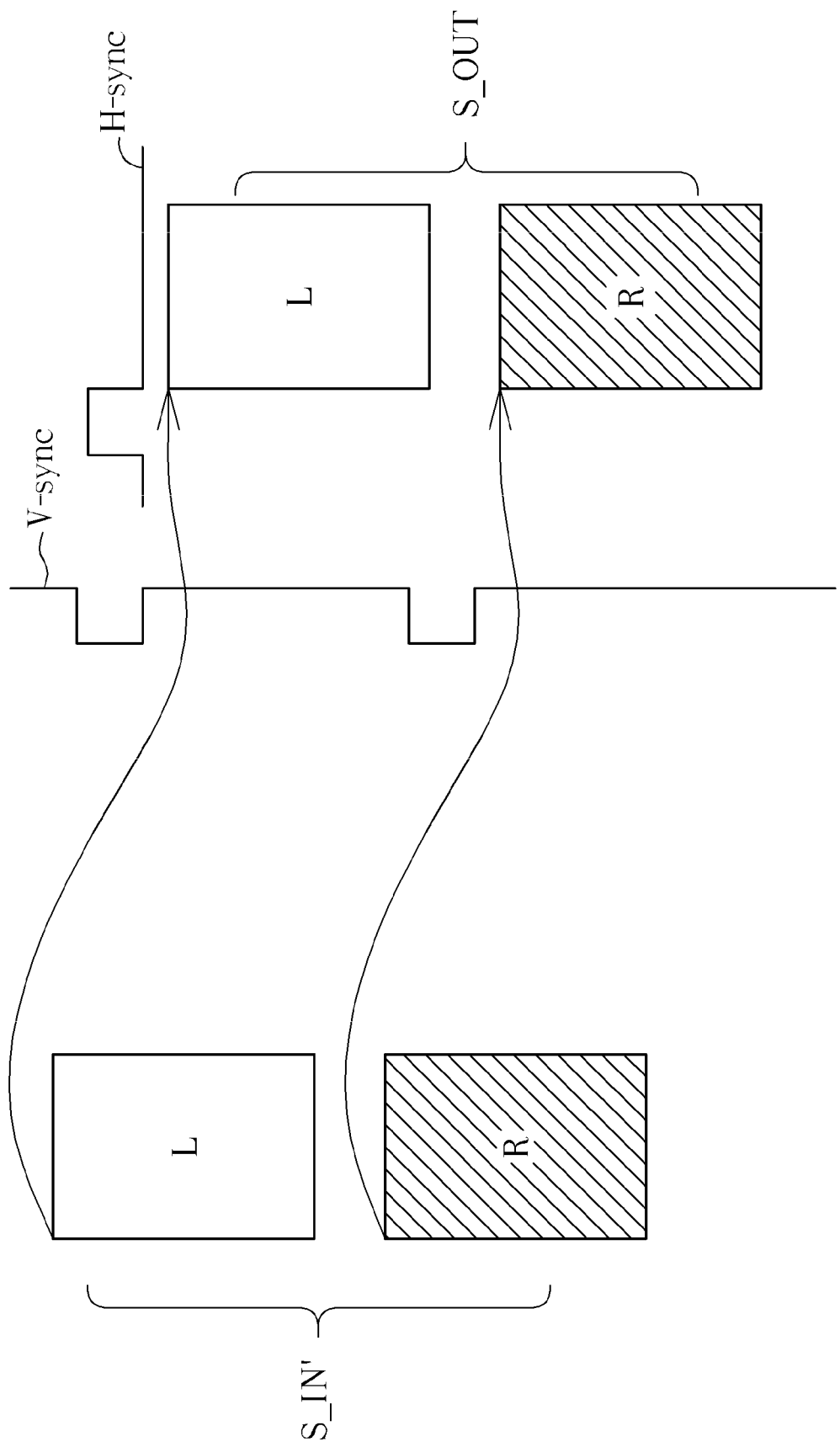
FIG. 10 is a diagram illustrating an exemplary data scanning operation for generating the video output with the frame/field sequential format according to the video input with the frame/field sequential format.

FIG. 10 is a diagram illustrating an exemplary data scanning operation for generating the video output with the frame/field sequential format according to the video input with the frame/field sequential format. In a first exemplary embodiment, the video output device 106 shown in FIG. 1 is realized by the video output device 900 shown in FIG. 9, where the display module 902 is configured to access one buffer in one data scanning clock period only. Therefore, the display module 902 is enabled to read data from a first input picture (e.g., the left-eye picture of the video input S_IN') stored in one buffer during a first data scanning clock period, read data from a second input picture (e.g., the right-eye picture of the video input S_IN') stored in another buffer during a second data scanning clock period, and accordingly obtain a first video data and a second video data. It should be noted that scaling may be applied to the data read from the buffers if necessary. In this embodiment, each of the first data scanning clock period and second data scanning clock period may be equal to a time period between two successive pulses of the vertical synchronization signal V-sync referenced for actual video display. In addition, the display module 902 generates a first output picture (e.g., a left-eye picture of the video output S_OUT) according to the first video data, and generates a second output picture (e.g., a right-eye picture of the video output S_OUT) according to the second video data, where the first output picture is transmitted during one time period between two successive pulses of the vertical synchronization signal V-sync, and the second output picture is transmitted during the next time period between two successive pulses of the vertical synchronization signal V-sync.

Figure 8:
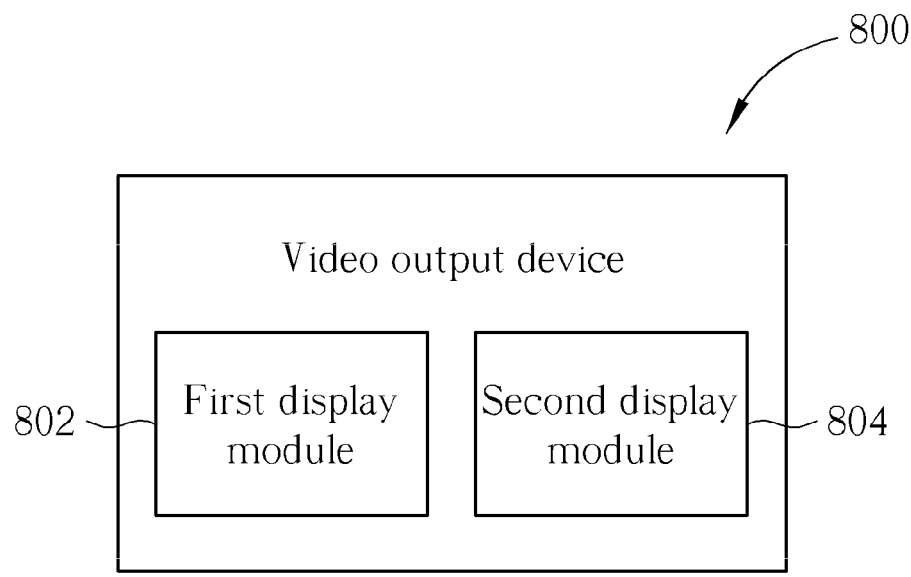
FIG. 8 is a diagram illustrating a first exemplary implementation of the video output device shown in FIG. 1.

In a second exemplary embodiment, the video output device 106 shown in FIG. 1 is realized by the video output device 800 shown in FIG. 8, where the first display module 802 and the second display module 804 can simultaneously access different buffers in one data scanning clock period. Therefore, during a data scanning clock period, the first display module 802 is enabled to read data from one buffer in which a first input picture (e.g., the left-eye picture of the video input S_IN') is stored and accordingly obtain a first video data; in addition, during the same data scanning clock period, the second display module 804 is also enabled to read data stored in another buffer in which a second input picture (e.g., the right-eye picture of the video input S_IN') is stored and accordingly obtain a second video data. It should be noted that scaling may be applied to the data read from the buffers if necessary. In this embodiment, the data scanning clock period may be equal to a time period between two successive pulses of the vertical synchronization signal V-sync referenced for actual video display. In addition, the first display module 802 generates a first output picture (e.g., a left-eye picture of the video output S_OUT) according to the first video data, and the second display module 804 generates a second output picture (e.g., a right-eye picture of the video output S_OUT) according to the second video data, where the first video data and the second video data simultaneously read from different buffers should be properly mixed such that the first output picture is transmitted during one time period between two successive pulses of the vertical synchronization signal V-sync and the second output picture is transmitted during the next time period between two successive pulses of the vertical synchronization signal V-sync.

In a third exemplary embodiment, the video output device 106 shown in FIG. 1 is realized by the video output device 900 shown in FIG. 9, where the display module 902 is configured to randomly access the buffers in each data scanning clock period. Therefore, during a data scanning clock period, the display module 902 is enabled to perform a random access for reading data from one buffer in which a first input picture (e.g., the left-eye picture of the video input S_IN') is stored and accordingly obtaining a first video data; in addition, during the same data scanning clock period, the display module 902 also performs a random access for reading data from another buffer in which a second input picture (e.g., the right-eye picture of the video input S_IN') is stored and accordingly obtaining a second video data. It should be noted that scaling may be applied to the data read from the buffers if necessary. In this embodiment, the data scanning clock period may be equal to a time period between two successive pulses of the vertical synchronization signal V-sync referenced for actual video display. In addition, the display module 902 generates a first output picture (e.g., a left-eye picture of the video output S_OUT) according to the first video data, and generates a second output picture (e.g., a right-eye picture of the video output S_OUT) according to the second video data, where the first output picture is transmitted during one time period between two successive pulses of the vertical synchronization signal V-sync and the second output picture is transmitted during the next time period between two successive pulses of the vertical synchronization signal V-sync.

Figure 11:
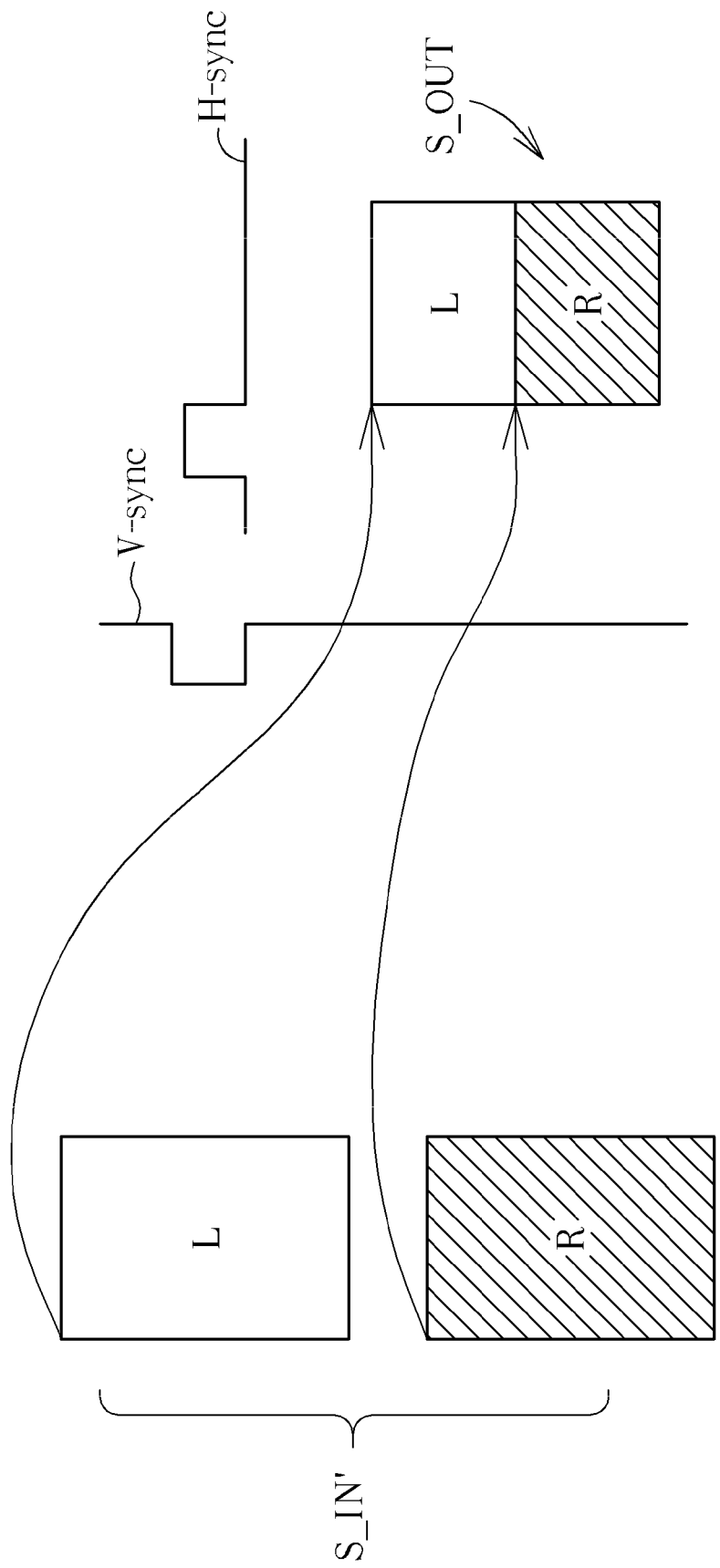
FIG. 11 is a diagram illustrating an exemplary data scanning operation for generating the video output with the top-and-bottom format according to the video input with the frame/field sequential format.

FIG. 11 is a diagram illustrating an exemplary data scanning operation for generating the video output with the top-and-bottom format according to the video input with the frame/field sequential format. In a first exemplary embodiment, the video output device 106 shown in FIG. 1 is realized by the video output device 900 shown in FIG. 9, where the display module 902 is configured to access one buffer in one data scanning clock period only. Therefore, the display module 902 is enabled to read data from a first input picture (e.g., the left-eye picture of the video input S_IN') stored in one buffer during a first data scanning clock period, read data from a second input picture (e.g., the right-eye picture of the video input S_IN') stored in another buffer during a second data scanning clock period, and accordingly obtain a first video data and a second video data. By way of example, but not limitation, half of the pixel data of the left-eye picture in the video input S_IN' is extracted as the first video data, and half of the pixel data of the right-eye picture in the video input S_IN' is extracted as the second video data. However, in an alternative design, scaling may be applied to the data read from the buffers if necessary. In this embodiment, each of the first data scanning clock period and the second data scanning clock period may be equal to half of a time period between two successive pulses of the vertical synchronization signal V-sync referenced for actual video display. The display module 902 therefore generates a first output picture (e.g., a left-eye picture of the video output S_OUT) according to the first video data, and generates a second output picture (e.g., a right-eye picture of the video output S_OUT) according to the second video data, where the first output picture and the second output picture are transmitted during one time period between two successive pulses of the vertical synchronization signal V-sync.

In a second exemplary embodiment, the video output device 106 shown in FIG. 1 is realized by the video output device 800 shown in FIG. 8, where the first display module 802 and the second display module 804 can simultaneously access buffers in one data scanning clock period. Therefore, during a data scanning clock period, the first display module 802 is enabled to read data from one buffer in which a first input picture (e.g., the left-eye picture of the video input S_IN') is stored and accordingly obtain a first video data; in addition, during the same data scanning clock period, the second display module 804 is enabled to read data stored in another buffer in which a second input picture (e.g., the right-eye picture of the video input S_IN') is stored and accordingly obtain a second video data. In this embodiment, the data scanning clock period may be equal to a time period between two successive pulses of the vertical synchronization signal V-sync referenced for actual video display. In addition, the first display module 802 generates a first output picture (e.g., a left-eye picture of the video output S_OUT) according to the first video data, and the second display module 804 generates a second output picture (e.g., a right-eye picture of the video output S_OUT) according to the second video data, where the first video data and the second video data simultaneously read from different buffers should be properly mixed such that the first output picture and the second output picture are transmitted during one time period between two successive pulses of the vertical synchronization signal V-sync.

In a third exemplary embodiment, the video output device 106 shown in FIG. 1 is realized by the video output device 900 shown in FIG. 9, where the display module 902 is configured to randomly access the buffers in each data scanning clock period. Therefore, during a data scanning clock period, the display module 902 is enabled to perform a random access for reading data from one buffer in which a first input picture (e.g., the left-eye picture of the video input S_IN') is stored and accordingly obtaining a first video data; in addition, during the same data scanning clock period, the display module 902 also performs a random access for reading data from another buffer in which a second input picture (e.g., the right-eye picture of the video input S_IN') is stored and accordingly obtaining a second video data. In this embodiment, the data scanning clock period may be equal to a time period between two successive pulses of the vertical synchronization signal V-sync referenced for actual video display. The display module 902 further generates a first output picture (e.g., a left-eye picture of the video output S_OUT) according to the first video data, and generates a second output picture (e.g., a right-eye picture of the video output S_OUT) according to the second video data, where the first output picture and the second output picture are transmitted during one time period between two successive pulses of the vertical synchronization signal V-sync.

Figure 12:
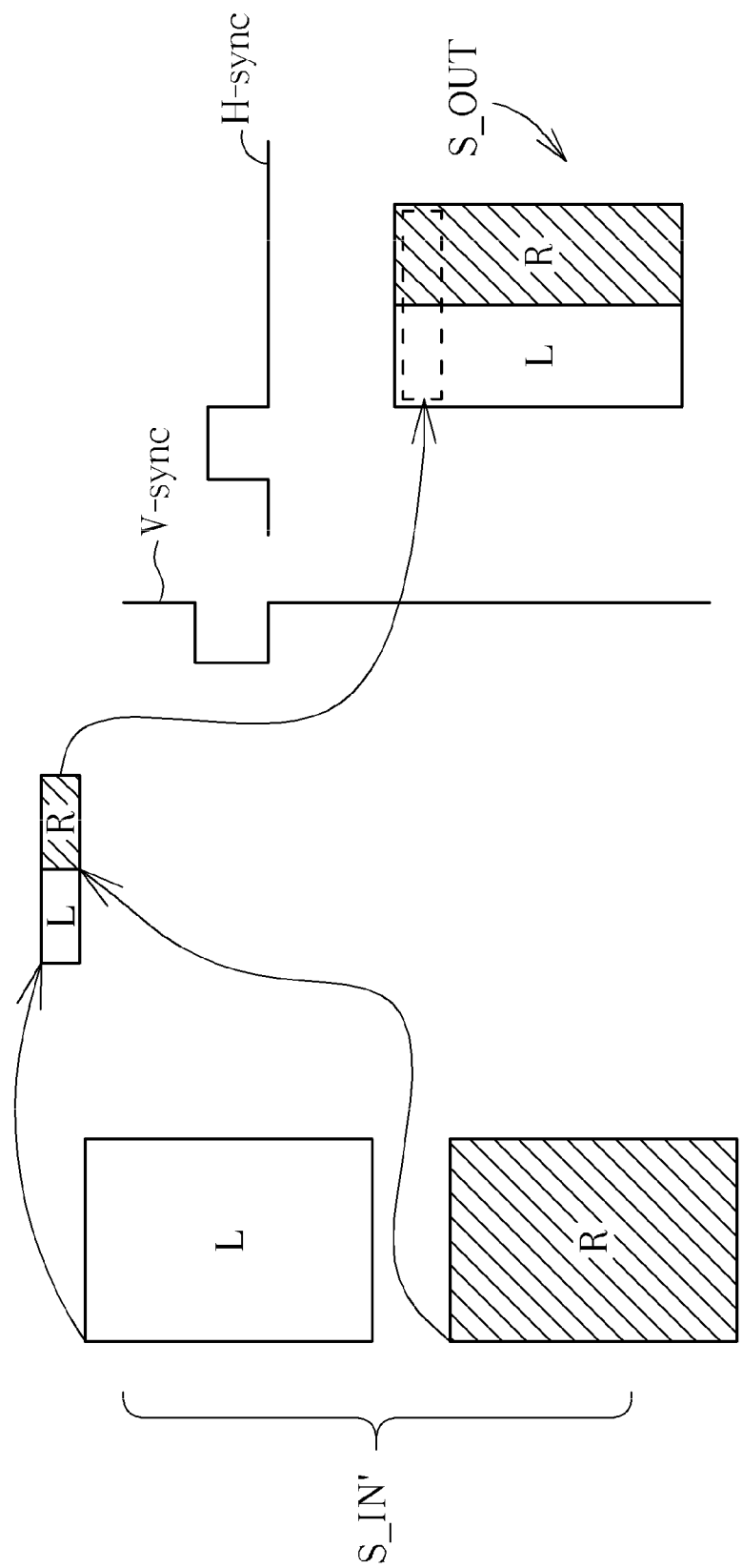
FIG. 12 is a diagram illustrating an exemplary data scanning operation for generating the video output with the side-by-side format according to the video input with the frame/field sequential format.

FIG. 12 is a diagram illustrating an exemplary data scanning operation for generating the video output with the side-by-side format according to the video input with the frame/field sequential format. In a first exemplary embodiment, the video output device 106 shown in FIG. 1 is realized by the video output device 800 shown in FIG. 8, where the first display module 802 and the second display module 804 can simultaneously access buffers in one data scanning clock period. Therefore, during a data scanning clock period, the first display module 802 is enabled to read data from one buffer in which a first input picture (e.g., the left-eye picture of the video input S_IN') is stored, and the second display module 804 is enabled to read data stored in another buffer in which a second input picture (e.g., the right-eye picture of the video input S_IN') is stored. As shown in FIG. 12, the partial scan line data of the first input picture and the partial scan line data of the second input picture are mixed to form one scan line which is transmitted during a time period between two successive pulses of the horizontal synchronization signal H-sync referenced for actual video display. In this way, the first display module 802 can obtain a first video data and the second display module 804 can obtain a second video data due to the repeated read operation for retrieving partial scan line data. It should be noted that scaling may be applied to the data read from the buffers if necessary. In this embodiment, the data scanning clock period may be equal to a time period between two successive pulses of the vertical synchronization signal V-sync referenced for actual video display. In addition, the first display module 802 generates a first output picture (e.g., a left-eye picture of the video output S_OUT) according to the first video data, and the second display module 804 generates a second output picture (e.g., a right-eye picture of the video output S_OUT) according to the second video data, where the first output picture and the second output picture are transmitted during one time period between two successive pulses of the vertical synchronization signal V-sync.

In a second exemplary embodiment, the video output device 106 shown in FIG. 1 is realized by the video output device 900 shown in FIG. 9, where the display module 902 is configured to randomly access the buffers in each data scanning clock period. Therefore, during a data scanning clock period, the display module 902 is enabled to perform a random access for reading data from one buffer in which a first input picture (e.g., the left-eye picture of the video input S_IN') is stored and reading data from another buffer in which a second input picture (e.g., the right-eye picture of the video input S_IN') is stored. Similarly, the partial scan line data of the first input picture and the partial scan line data of the second input picture are mixed to form one scan line which is transmitted during a time period between two successive pulses of the horizontal synchronization signal H-sync referenced for actual video display. In this way, the display module 902 obtains a first video data and a second video data due to the repeated read operation for retrieving partial scan line data. It should be noted that scaling may be applied to the data read from the buffers if necessary. In this embodiment, the data scanning clock period may be equal to a time period between two successive pulses of the vertical synchronization signal V-sync referenced for actual video display. The display module 902 further generates a first output picture (e.g., a left-eye picture of the video output S_OUT) according to the first video data, and generates a second output picture (e.g., a right-eye picture of the video output S_OUT) according to the second video data, where the first output picture and the second output picture are transmitted during one time period between two successive pulses of the vertical synchronization signal V-sync.

Figure 13:
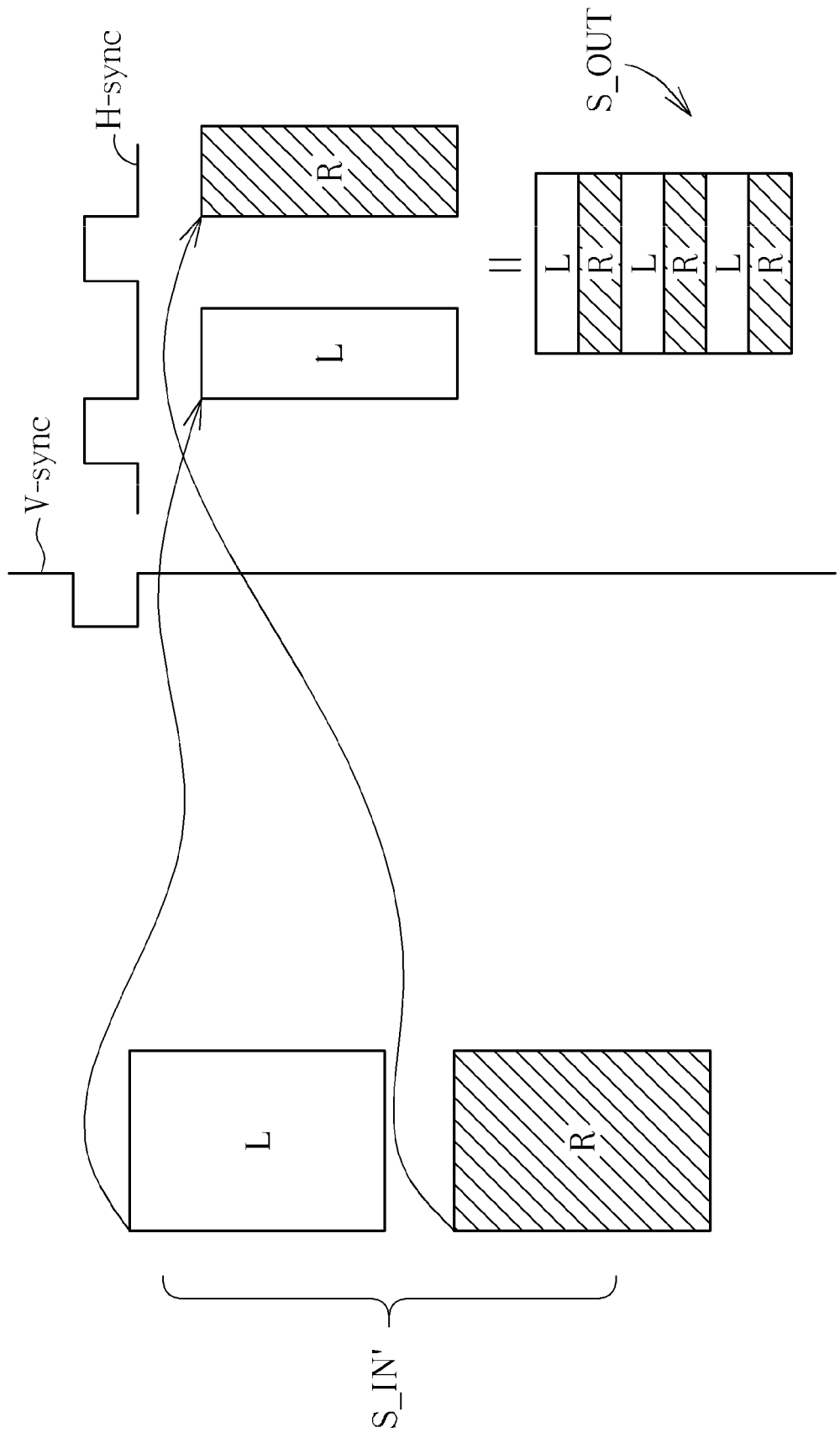
FIG. 13 is a diagram illustrating an exemplary data scanning operation for generating the video output with the line-by-line format according to the video input with the frame/field sequential format.

FIG. 13 is a diagram illustrating an exemplary data scanning operation for generating the video output with the line-by-line format according to the video input with the frame/field sequential format. In a first exemplary embodiment, the video output device 106 shown in FIG. 1 is realized by the video output device 800 shown in FIG. 8, where the first display module 802 and the second display module 804 can simultaneously access buffers in one data scanning clock period. Therefore, during a data scanning clock period, the first display module 802 is enabled to read data from one buffer in which a first input picture (e.g., the left-eye picture of the video input S_IN') is stored, and the second display module 804 is also enabled to read data stored in another buffer in which a second input picture (e.g., the right-eye picture of the video input S_IN') is stored. In one implementation, the scan line data of an odd scan line read from the first input picture is transmitted during a time period between two successive pulses of the horizontal synchronization signal H-sync referenced for actual video display, and the scan line data of an even scan line read from the second input picture is transmitted during the next time period between two successive pulses of the horizontal synchronization signal H-sync. Because of the alternate transmission of the scan line data read from the first input picture and the scan line data read from the second input picture under the control of the properly generated horizontal synchronization signal H-sync, the video output S_OUT with the desired line-by-line format is generated. Specifically, the first display module 802 obtains a first video data and the second display module 804 obtains a second video data due to the repeated read operation for retrieving the scan line data. It should be noted that scaling may be applied to the data read from the buffers if necessary. In this embodiment, the data scanning clock period may be equal to a time period between two successive pulses of the vertical synchronization signal V-sync referenced for actual video display. In addition, the first display module 802 generates a first output picture (e.g., a left-eye picture of the video output S_OUT) according to the first video data, and the second display module 804 generates a second output picture (e.g., a right-eye picture of the video output S_OUT) according to the second video data, where the first output picture and the second output picture are transmitted during one time period between two successive pulses of the vertical synchronization signal V-sync.

In a second exemplary embodiment, the video output device 106 shown in FIG. 1 is realized by the video output device 900 shown in FIG. 9, where the display module 902 is configured to randomly access the buffers in each data scanning clock period. Therefore, during a data scanning clock period, the display module 902 is enabled to perform a random access for reading data from one buffer in which a first input picture (e.g., the left-eye picture of the video input S_IN') is stored and reading data from another buffer in which a second input picture (e.g., the right-eye picture of the video input S_IN') is stored. Similarly, the scan line data of an odd scan line read from the first input picture and the scan line data of an even scan line read from the second input picture are respectively transmitted during successive time periods each between two successive pulses of the horizontal synchronization signal H-sync referenced for actual video display. In this way, the display module 902 obtains a first video data and a second video data due to the repeated read operation for retrieving the scan line data. It should be noted that scaling may be applied to the data read from the buffers if necessary. In this embodiment, the data scanning clock period may be equal to a time period between two successive pulses of the vertical synchronization signal V-sync referenced for actual video display. In addition, the display module 902 generates a first output picture (e.g., a left-eye picture of the video output S_OUT) according to the first video data, and generates a second output picture (e.g., a right-eye picture of the video output S_OUT) according to the second video data, where the first output picture and the second output picture are transmitted during one time period between two successive pulses of the vertical synchronization signal V-sync.

Figure 39:
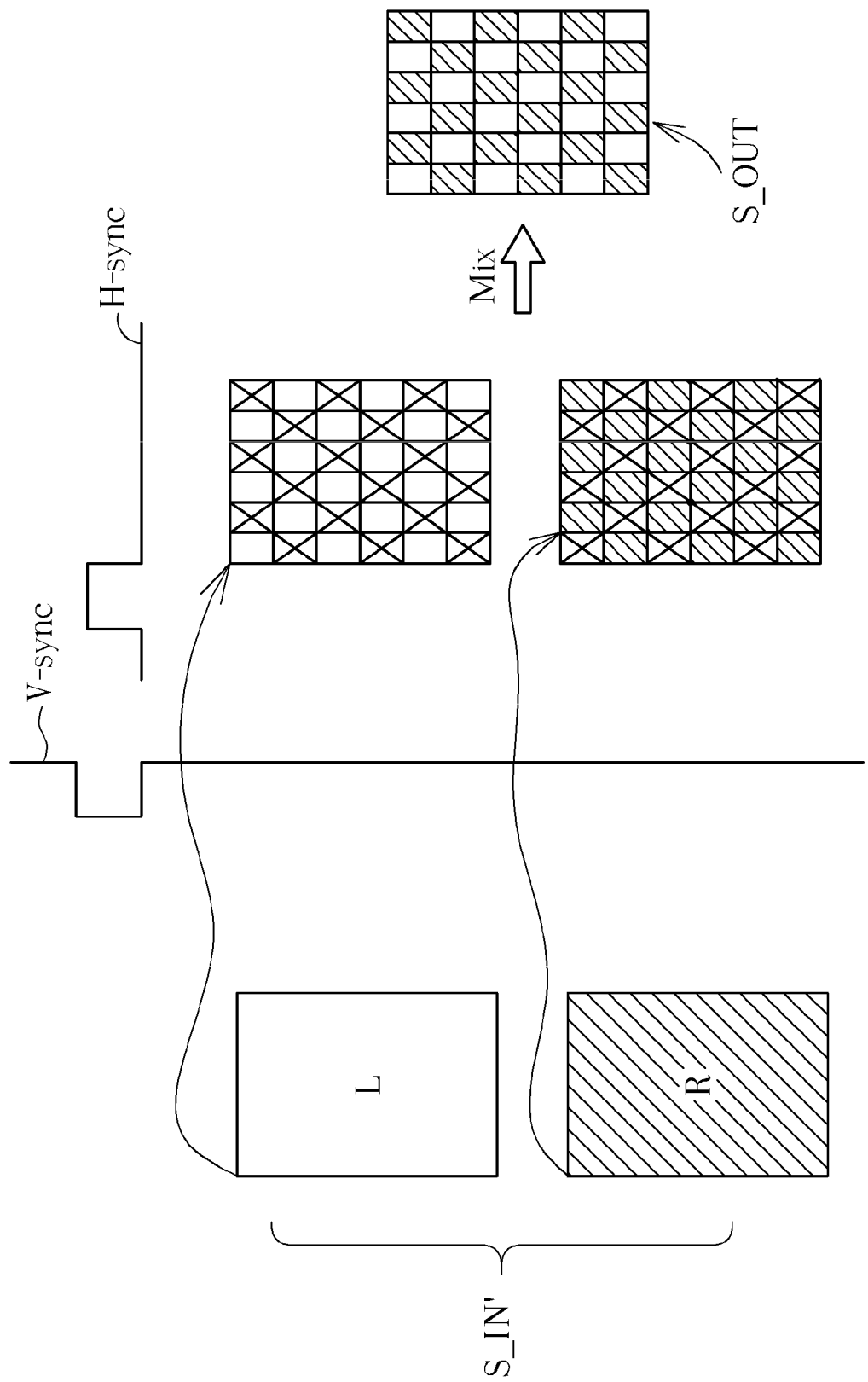
FIG. 39 is a diagram illustrating an exemplary data scanning operation for generating the video output with the checker sampling format according to the video input with the frame/field sequential format.

FIG. 39 is a diagram illustrating an exemplary data scanning operation for generating the video output with the checker sampling format according to the video input with the frame/field sequential format. In this exemplary embodiment, the video output device 106 shown in FIG. 1 is realized by the video output device 800 shown in FIG. 8, where the first display module 802 and the second display module 804 can simultaneously access different buffers in one data scanning clock period. Therefore, during a data scanning clock period, the first display module 802 is enabled to read data from one buffer in which a first input picture (e.g., the left-eye picture of the video input S_IN') is stored and accordingly obtain a first video data; in addition, during the same data scanning clock period, the second display module 804 is also enabled to read data stored in another buffer in which a second input picture (e.g., the right-eye picture of the video input S_IN') is stored and accordingly obtain a second video data. It should be noted that scaling may be applied to the data read from the buffers if necessary. In this embodiment, the data scanning clock period may be equal to a time period between two successive pulses of the vertical synchronization signal V-sync referenced for actual video display. As shown in FIG. 39, the first display module 802 obtains the first video data with a plurality of black areas distributed therein, wherein each black area (i.e., a crossed-out area marked by "X") includes pixels each having no effect on the mixed picture. Similarly, the second display module 804 obtains the second video data with a plurality of black areas distributed therein, wherein each black area (i.e., a crossed-out area marked by "X") includes pixels each having no effect on the mixed picture. The first display module 802 generates a first output picture (e.g., a left-eye picture of the video output S_OUT) according to the first video data, and the second display module 804 generates a second output picture (e.g., a right-eye picture of the video output S_OUT) according to the second video data, where the first video data and the second video data should be properly mixed to thereby generate the video output S_OUT with the desired checker sampling format as shown in FIG. 39. Please note that the black areas have no dominant effect on the mixed result (i.e., the video output S_OUT) in this embodiment.

Figure 40:
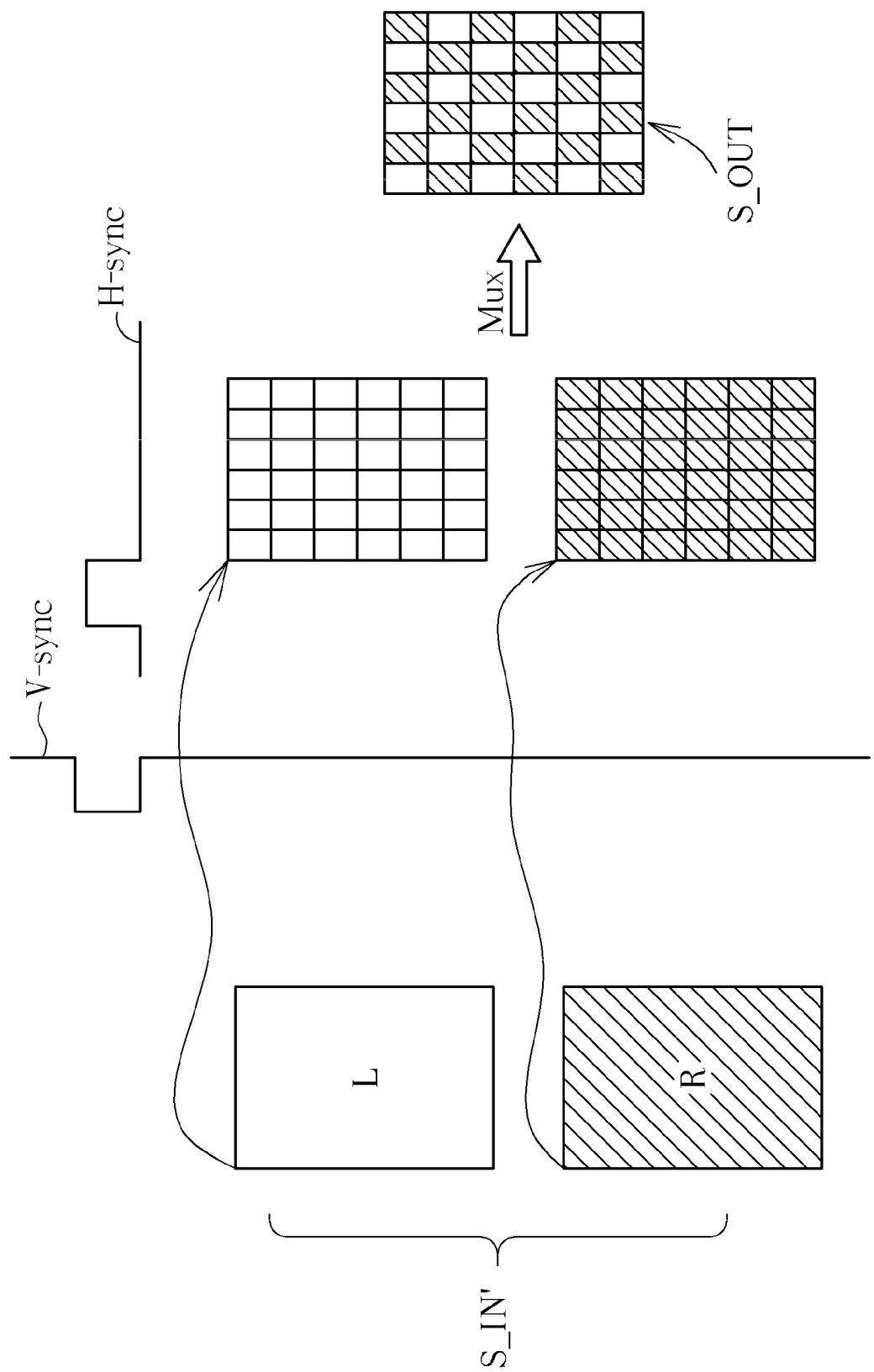
FIG. 40 is a diagram illustrating another exemplary data scanning operation for generating the video output with the checker sampling format according to the video input with the frame/field sequential format.

FIG. 40 is a diagram illustrating another exemplary data scanning operation for generating the video output with the checker sampling format according to the video input with the frame/field sequential format. In this exemplary embodiment, the video output device 106 shown in FIG. 1 is realized by the video output device 800 shown in FIG. 8, where the first display module 802 and the second display module 804 can simultaneously access different buffers in one data scanning clock period. Therefore, during a data scanning clock period, the first display module 802 is enabled to read data from one buffer in which a first input picture (e.g., the left-eye picture of the video input S_IN') is stored and accordingly obtain a first video data; in addition, during the same data scanning clock period, the second display module 804 is also enabled to read data stored in another buffer in which a second input picture (e.g., the right-eye picture of the video input S_IN') is stored and accordingly obtain a second video data. It should be noted that scaling may be applied to the data read from the buffers if necessary. In this embodiment, the data scanning clock period may be equal to a time period between two successive pulses of the vertical synchronization signal V-sync referenced for actual video display. Next, the first display module 802 generates a first output picture (e.g., a left-eye picture of the video output S_OUT) according to the first video data, and the second display module 804 generates a second output picture (e.g., a right-eye picture of the video output S_OUT) according to the second video data, where the first video data and the second video data should be properly multiplexed to thereby generate the video output S_OUT with the desired checker sampling format as shown in FIG. 40. For example, the first display module 802 and the second display module 804 obtain the first video data and the second video data according to a slower data rate; however, the first display module 802 and the second display module 804 output the first video data and the second video data according to a faster data rate used for multiplexing the output of the first video data and the second video data. For example, in one clock cycle of a reference clock, only the first display module 802 is allowed to output data; however, in the next clock cycle of the reference clock, only the second display module 804 is allowed to output data.

Figure 14:
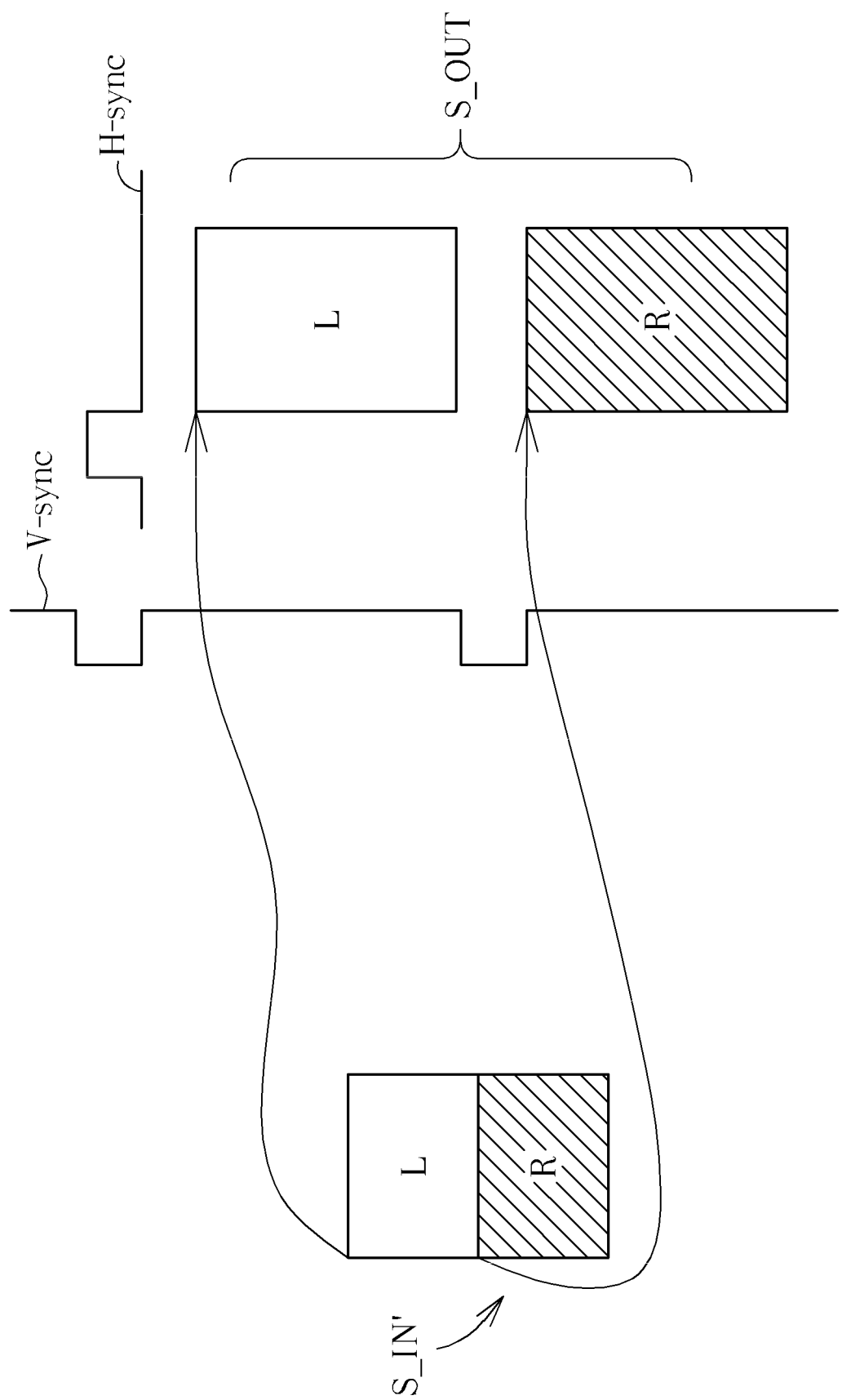
FIG. 14 is a diagram illustrating an exemplary data scanning operation for generating the video output with the frame/field sequential format according to the video input with the top-and-bottom format.
Figure 17:
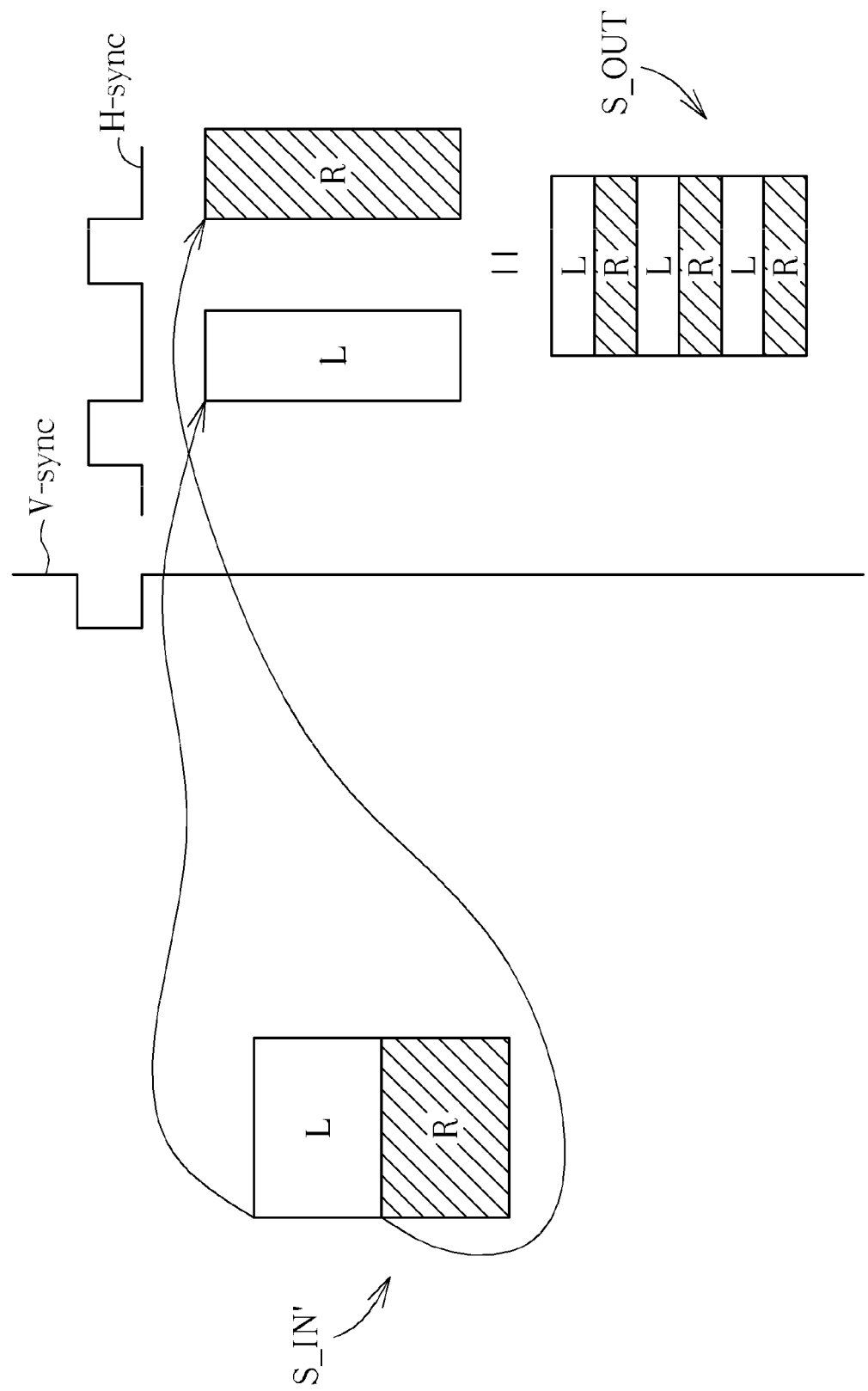
FIG. 17 is a diagram illustrating an exemplary data scanning operation for generating the video output with the line-by-line format according to the video input with the top-and-bottom format.
Figure 41:
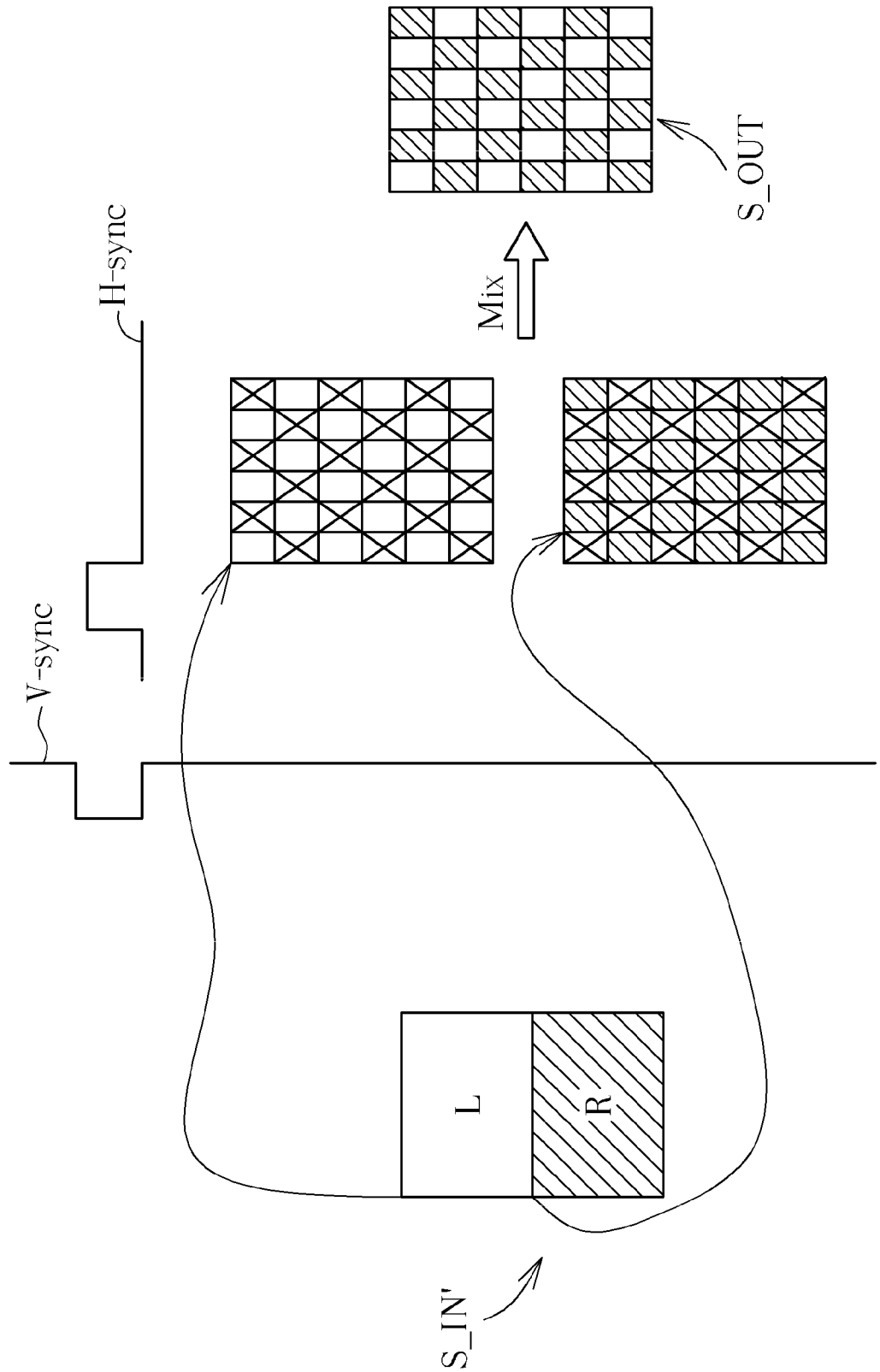
FIG. 41 is a diagram illustrating an exemplary data scanning operation for generating the video output with the checker sampling format according to the video input with the top-and-bottom format.
Figure 42:
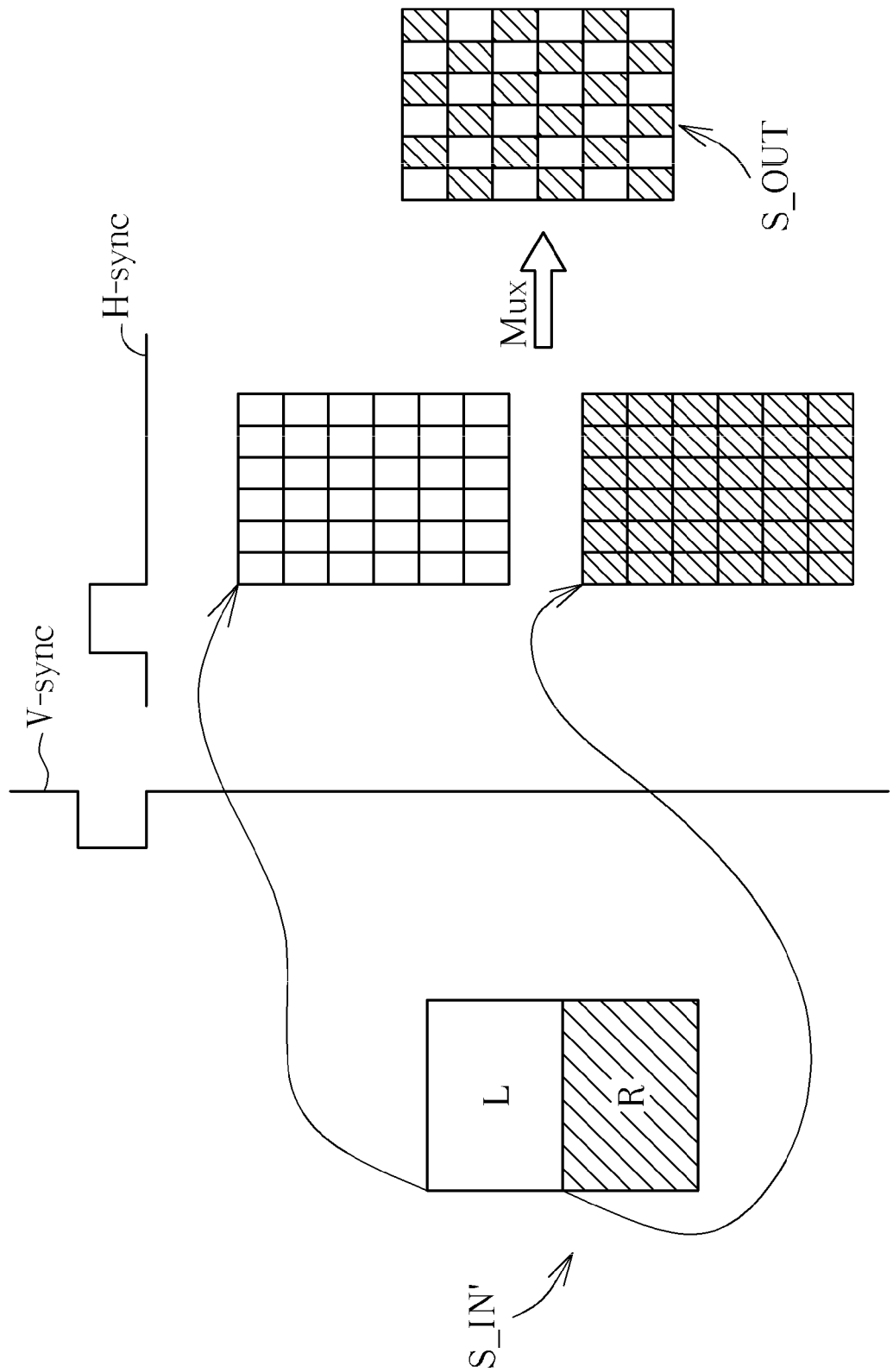
FIG. 42 is a diagram illustrating another exemplary data scanning operation for generating the video output with the checker sampling format according to the video input with the top-and-bottom format.

FIG. 14 is a diagram illustrating an exemplary data scanning operation for generating the video output with the frame/field sequential format according to the video input with the top-and-bottom format. FIG. 15 is a diagram illustrating an exemplary data scanning operation for generating the video output with the top-and-bottom format according to the video input with the top-and-bottom format. FIG. 16 is a diagram illustrating an exemplary data scanning operation for generating the video output with the side-by-side format according to the video input with the top-and-bottom format. FIG. 17 is a diagram illustrating an exemplary data scanning operation for generating the video output with the line-by-line format according to the video input with the top-and-bottom format. FIG. 41 is a diagram illustrating an exemplary data scanning operation for generating the video output with the checker sampling format according to the video input with the top-and-bottom format. FIG. 42 is a diagram illustrating another exemplary data scanning operation for generating the video output with the checker sampling format according to the video input with the top-and-bottom format. As mentioned above, the storage arrangement for the video input S_IN' with the frame/field sequential format is identical to that of the video input S_IN' with the top-and-bottom format. Therefore, a person skilled in the art can readily understand details of the exemplary data scanning operations shown in FIG. 14-FIG. 17 and FIG. 41-FIG. 42 after reading above paragraphs directed to exemplary data scanning operations shown in FIG. 10-FIG. 13 and FIG. 39-FIG. 40. Further description is therefore omitted here for brevity.

Figure 18:
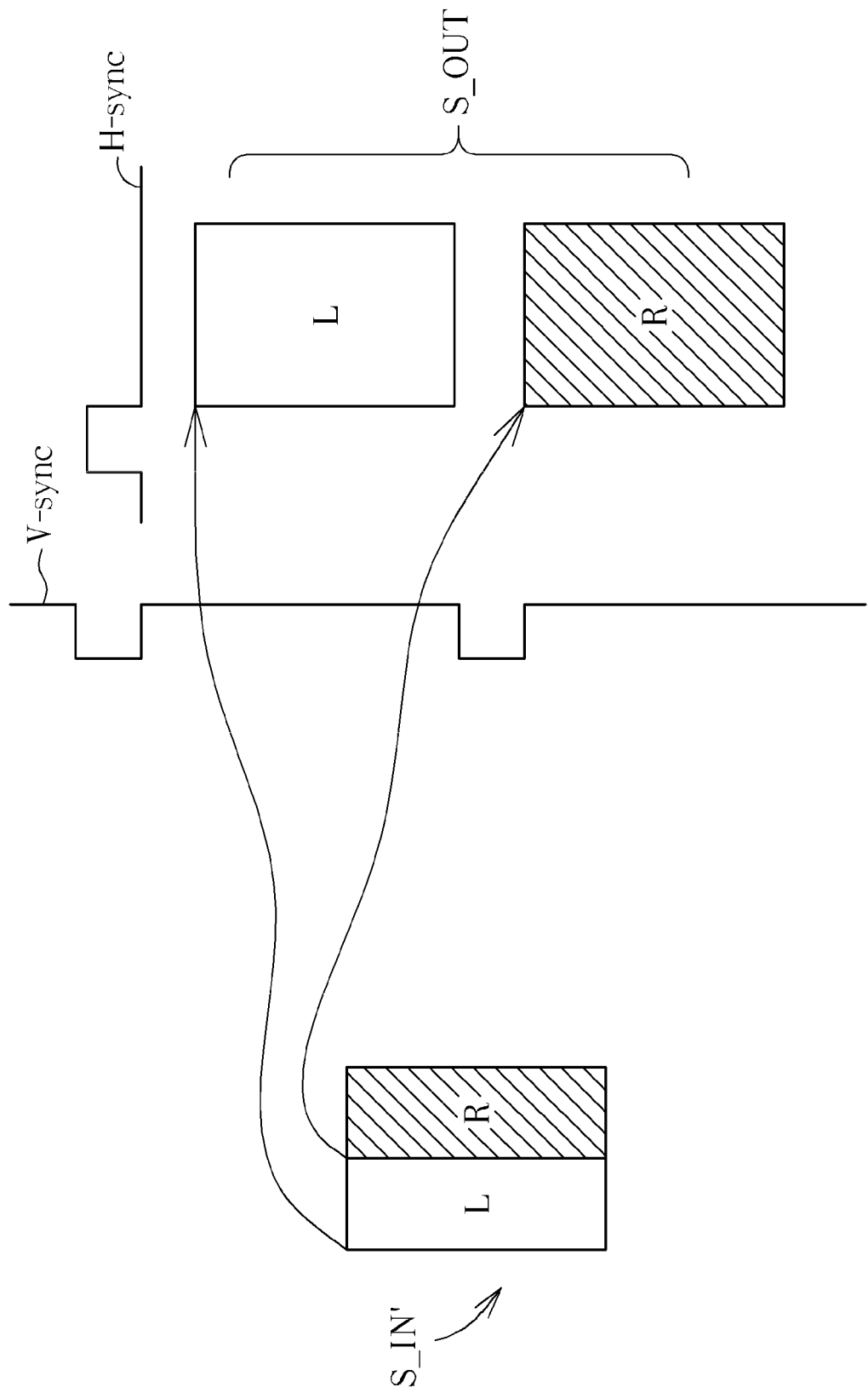
FIG. 18 is a diagram illustrating an exemplary data scanning operation for generating the video output with the frame/field sequential format according to the video input with the side-by-side format.

FIG. 18 is a diagram illustrating an exemplary data scanning operation for generating the video output with the frame/field sequential format according to the video input with the side-by-side format. In a first exemplary embodiment, the video output device 106 shown in FIG. 1 is realized by the video output device 900 shown in FIG. 9, where the display module 902 is configured to access one buffer in one data scanning clock period only. Therefore, during a first data scanning clock period, the display module 902 is enabled to read data from a first input picture (e.g., the left-eye picture of the video input S_IN') stored in one buffer; in addition, during a second data scanning clock period, the display module 902 is enabled to read data from a second input picture (e.g., the right-eye picture of the video input S_IN') stored in the same buffer. It should be noted that scan line data of a scan line read from the first input picture should be properly scaled if necessary, and the scan line data of a scan line read from the second input picture should be properly scaled if necessary. In this embodiment, each of the first data scanning clock period and the second data scanning clock period may be equal to a time period between two successive pulses of the vertical synchronization signal V-sync referenced for actual video display. In addition, the display module 902 generates a first output picture (e.g., a left-eye picture of the video output S_OUT) according to the first video data, and generates a second output picture (e.g., a right-eye picture of the video output S_OUT) according to the second video data, where the first output picture is transmitted during one time period between two successive pulses of the vertical synchronization signal V-sync, and the second output picture is transmitted during the next time period between two successive pulses of the vertical synchronization signal V-sync.

In a second exemplary embodiment, the video output device 106 shown in FIG. 1 is realized by the video output device 800 shown in FIG. 8, where the first display module 802 and the second display module 804 can simultaneously access one buffer in one data scanning clock period. Therefore, during a data scanning clock period, the first display module 802 is enabled to read data from a first input picture (e.g., the left-eye picture of the video input S_IN') stored in one buffer, and the second display module 804 is enabled to read data from a second input picture (e.g., the right-eye picture of the video input S_IN') stored in the same buffer. Similarly, the scan line data of a scan line read from the first input picture should be scaled if necessary, and the scan line data of a scan line read from the second input picture should be scaled if necessary. Accordingly, the first display module 802 obtains a first video data, and the second display module 804 obtains a second video data. In this embodiment, the data scanning clock period may be equal to a time period between two successive pulses of the vertical synchronization signal V-sync referenced for actual video display. In addition, the first display module 802 generates a first output picture (e.g., a left-eye picture of the video output S_OUT) according to the first video data, and the second display module 804 generates a second output picture (e.g., a right-eye picture of the video output S_OUT) according to the second video data, where the first video data and the second video data simultaneously read from the same buffer are properly mixed such that the first output picture is transmitted during one time period between two successive pulses of the vertical synchronization signal V-sync and the second output picture is transmitted during the next time period between two successive pulses of the vertical synchronization signal V-sync.

In a third exemplary embodiment, the video output device 106 shown in FIG. 1 is realized by the video output device 900 shown in FIG. 9, where the display module 902 is configured to randomly access one buffer in each data scanning clock period. Therefore, during a data scanning clock period, the display module 902 is enabled to perform a random access for reading data from a first input picture (e.g., the left-eye picture of the video input S_IN') stored in one buffer and reading data from a second input picture (e.g., the right-eye picture of the video input S_IN') stored in the same buffer. Similarly, scan line data of a scan line read from the first input picture should be scaled is necessary, and the scan line data of a scan line read from the second input picture should be scaled if necessary. Accordingly, the display module 902 obtains a first video data and a second video data. In this embodiment, the data scanning clock period may be equal to a time period between two successive pulses of the vertical synchronization signal V-sync referenced for actual video display. In addition, the display module 902 generates a first output picture (e.g., a left-eye picture of the video output S_OUT) according to the first video data, and generates a second output picture (e.g., a right-eye picture of the video output S_OUT) according to the second video data, where the first output picture is transmitted during one time period between two successive pulses of the vertical synchronization signal V-sync and the second output picture is transmitted during the next time period between two successive pulses of the vertical synchronization signal V-sync.

Figure 19:
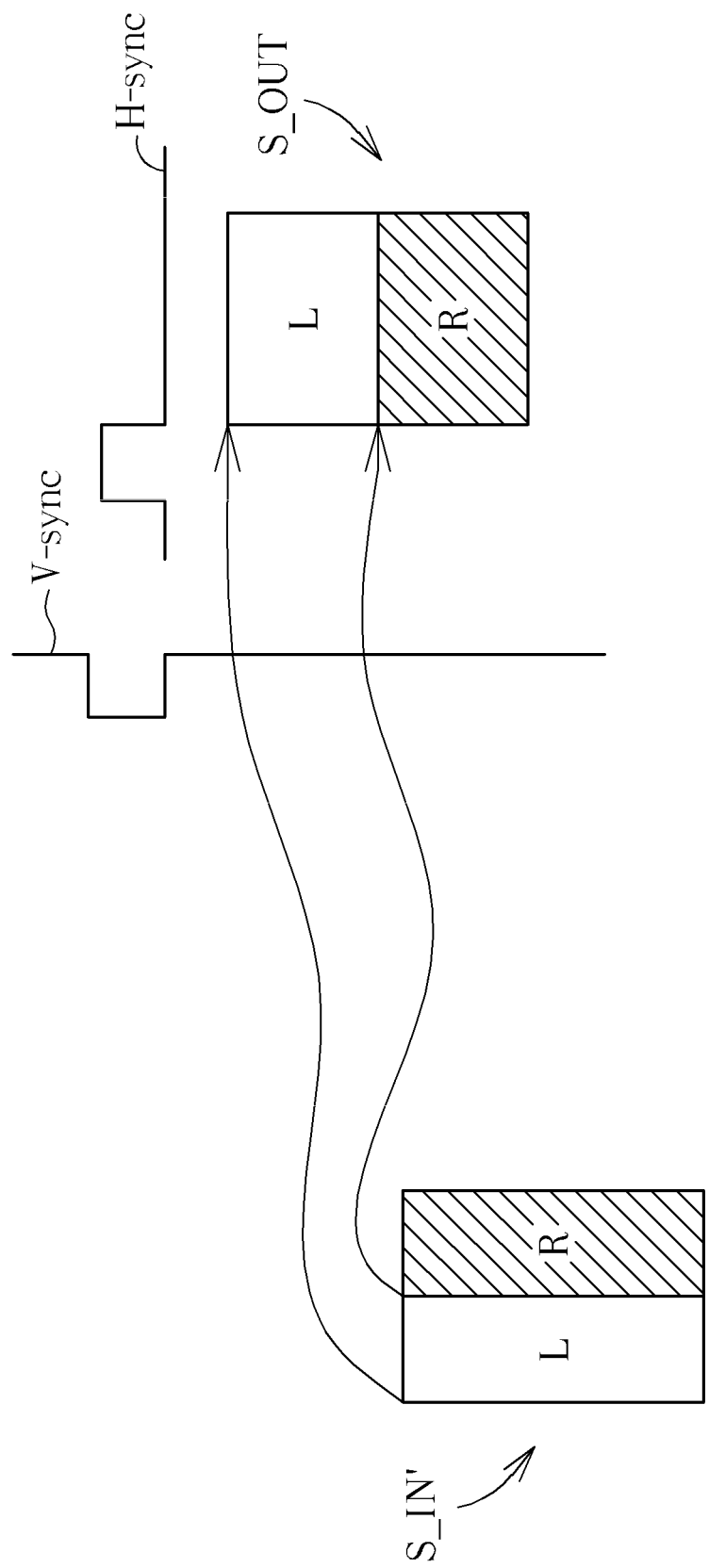
FIG. 19 is a diagram illustrating an exemplary data scanning operation for generating the video output with the top-and-bottom format according to the video input with the side-by-side format.

FIG. 19 is a diagram illustrating an exemplary data scanning operation for generating the video output with top-and-bottom format according to the video input with the side-by-side format. In a first exemplary embodiment, the video output device 106 shown in FIG. 1 is realized by the video output device 900 shown in FIG. 9, where the display module 902 is configured to access one buffer in one data scanning clock period only. Therefore, during a first data scanning clock period, the display module 902 is enabled to read data from a first input picture (e.g., the left-eye picture of the video input S_IN') stored in one buffer; in addition, during a second data scanning clock period, the display module 902 is enabled to read data from a second input picture (e.g., the right-eye picture of the video input S_IN') stored in the same buffer. Accordingly, the display module 902 obtains a first video data and a second video data. By way of example, but not limitation, half of the pixel data of the first input picture is read and then scaled to become the first video data, and half of the pixel data of the second input picture is read and then scaled to become the second video data. That is, scaling would be applied to the data read from the buffer if necessary. In this embodiment, each of the first data scanning clock period and the second data scanning clock period may be equal to a half of a time period between two successive pulses of the vertical synchronization signal V-sync referenced for actual video display. In addition, the display module 902 generates a first output picture (e.g., a left-eye picture of the video output S_OUT) according to the first video data, and generates a second output picture (e.g., a right-eye picture of the video output S_OUT) according to the second video data, where the first output picture and the second output picture are transmitted during one time period between two successive pulses of the vertical synchronization signal V-sync.

In a second exemplary embodiment, the video output device 106 shown in FIG. 1 is realized by the video output device 800 shown in FIG. 8, the first display module 802 and the second display module 804 can simultaneously access one buffer in one data scanning clock period. Therefore, during a data scanning clock period, the first display module 802 is enabled to read data from a first input picture (e.g., the left-eye picture of the video input S_IN') stored in one buffer, and the second display module 804 is enabled to read data from a second input picture (e.g., the right-eye picture of the video input S_IN') stored in the same buffer. Accordingly, the first display module 802 obtains a first video data, and the second display module 804 obtains a second video data. Similarly, scaling should be applied to the data read from the buffer if necessary. In this embodiment, the data scanning clock period may be equal to a time period between two successive pulses of the vertical synchronization signal V-sync which is referenced for displaying. In addition, the first display module 802 generates a first output picture (e.g., a left-eye picture of the video output S_OUT) according to the first video data, and the second display module 804 generates a second output picture (e.g., a right-eye picture of the video output S_OUT) according to the second video data, where the first video data and the second video data simultaneously read from the same buffer are properly mixed such that the first output picture and the second output picture are transmitted during one time period between two successive pulses of the vertical synchronization signal V-sync.

In a third exemplary embodiment, the video output device 106 shown in FIG. 1 is realized by the video output device 900 shown in FIG. 9, where the display module 902 is configured to randomly access one buffer in each data scanning clock period. Therefore, during a data scanning clock period, the display module 902 is enabled to perform a random access for reading data from a first input picture (e.g., the left-eye picture of the video input S_IN') stored in one buffer and reading data from a second input picture (e.g., the right-eye picture of the video input S_IN') stored in the same buffer. Accordingly, the display module 902 obtains a first video data and a second video data. Similarly, scaling should be applied to the data read from the buffer if necessary. In this embodiment, the data scanning clock period may be equal to a time period between two successive pulses of the vertical synchronization signal V-sync referenced for actual video display. In addition, the display module 902 generates a first output picture (e.g., a left-eye picture of the video output S_OUT) according to the first video data, and generates a second output picture (e.g., a right-eye picture of the video output S_OUT) according to the second video data, where the first output picture and the second output picture are transmitted during one time period between two successive pulses of the vertical synchronization signal V-sync.

Figure 20:
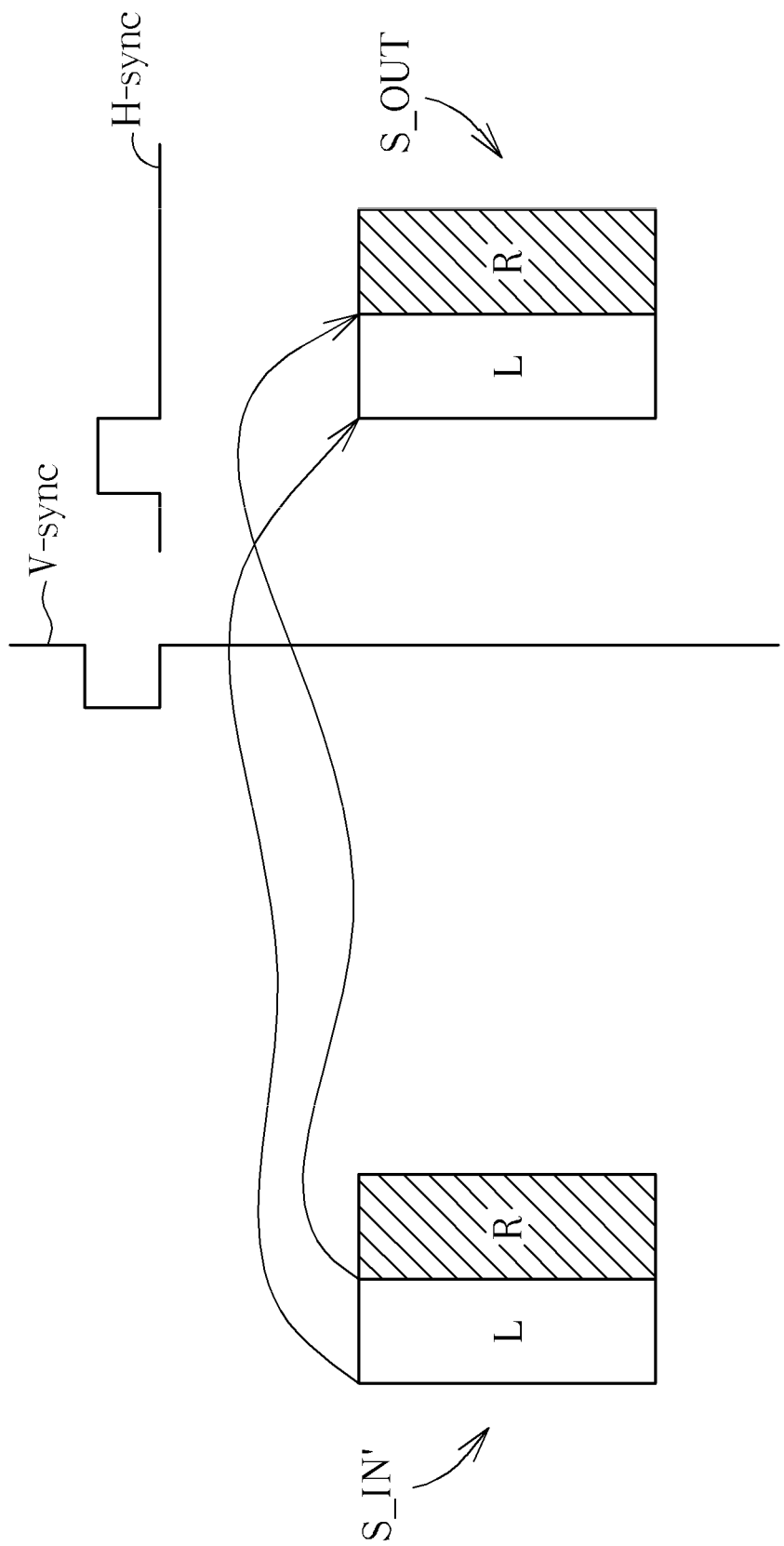
FIG. 20 is a diagram illustrating an exemplary data scanning operation for generating the video output with the side-by-side format according to the video input with the side-by-side format.

FIG. 20 is a diagram illustrating an exemplary data scanning operation for generating the video output with the side-by-side format according to the video input with the side-by-side format. In a first exemplary embodiment, the video output device 106 shown in FIG. 1 is realized by the video output device 800 shown in FIG. 8, where the first display module 802 and the second display module 804 can simultaneously access one buffer in one data scanning clock period. Therefore, during a data scanning clock period, the first display module 802 is enabled to read data from a first input picture (e.g., the left-eye picture of the video input S_IN') stored in a buffer, and the second display module 804 is enabled to read data from a second input picture (e.g., the right-eye picture of the video input S_IN') stored in the same buffer. As shown in FIG. 20, the scan line data of a scan line read from the first input picture and the scan line data of a scan line read from the second input picture are mixed to form one scan line which is transmitted during a time period between two successive pulses of the horizontal synchronization signal H-sync referenced for actual video display. In this way, the first display module 802 obtains a first video data and the second display module 804 obtains a second video data due to the repeated read operation for retrieving the partial scan line data. It should be noted that scaling should be applied to the data read from the buffer if necessary. In this embodiment, the data scanning clock period may be equal to a time period between two successive pulses of the vertical synchronization signal V-sync referenced for actual video display. In addition, the first display module 802 generates a first output picture (e.g., a left-eye picture of the video output S_OUT) according to the first video data, and the second display module 804 generates a second output picture (e.g., a right-eye picture of the video output S_OUT) according to the second video data, where the first output picture and the second output picture are transmitted during one time period between two successive pulses of the vertical synchronization signal V-sync.

In a second exemplary embodiment, the video output device 106 shown in FIG. 1 is realized by the video output device 900 shown in FIG. 9, where the display module 902 is configured to randomly access one buffer in each data scanning clock period. Therefore, during a data scanning clock period, the display module 902 is enabled to perform a random access for reading data from a first input picture (e.g., the left-eye picture of the video input S_IN') stored in a buffer and reading data from a second input picture (e.g., the right-eye picture of the video input S_IN') stored in the same buffer. Similarly, the scan line data of a scan line read from the first input picture and the scan line data of a scan line read from the second input picture are mixed to form one scan line which is transmitted during a time period between two successive pulses of the horizontal synchronization signal H-sync referenced for actual video display. Similarly, scaling should be applied to the data read from the buffer if necessary. In this way, the display module 902 obtains a first video data and a second video data due to the repeated read operation for retrieving the scan line data. In this embodiment, the data scanning clock period may be equal to a time period between two successive pulses of the vertical synchronization signal V-sync referenced for actual video display. In addition, the display module 902 generates a first output picture (e.g., a left-eye picture of the video output S_OUT) according to the first video data, and generates a second output picture (e.g., a right-eye picture of the video output S_OUT) according to the second video data, where the first output picture and the second output picture are transmitted during one time period between two successive pulses of the vertical synchronization signal V-sync.

Figure 21:
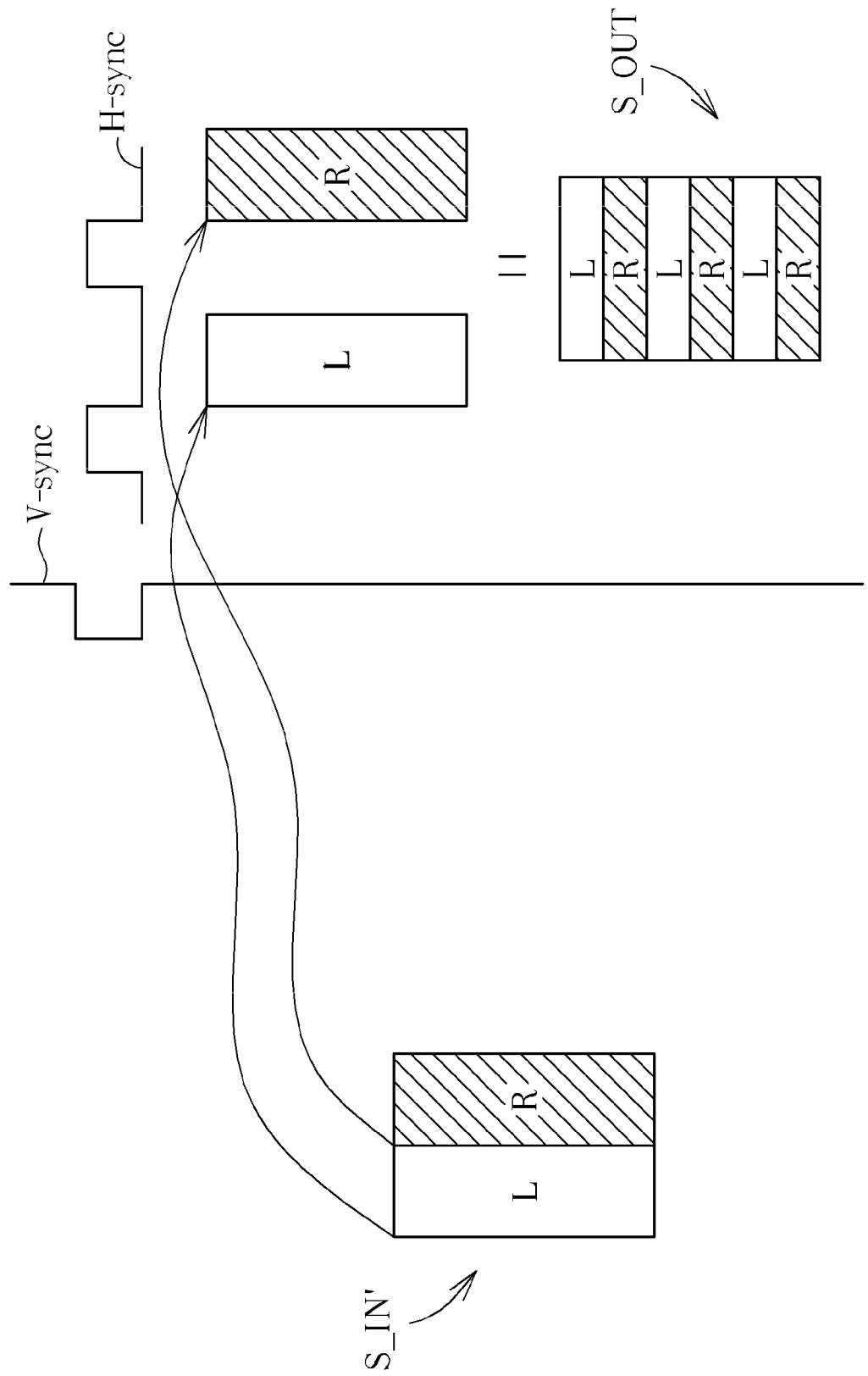
FIG. 21 is a diagram illustrating an exemplary data scanning operation for generating the video output with the line-by-line format according to the video input with the side-by-side format.

FIG. 21 is a diagram illustrating an exemplary data scanning operation for generating the video output with the line-by-line format according to the video input with the side-by-side format. In a first exemplary embodiment, the video output device 106 shown in FIG. 1 is realized by the video output device 800 shown in FIG. 8, where the first display module 802 and the second display module 804 can simultaneously access a buffer in one data scanning clock period. Therefore, during a data scanning clock period, the first display module 802 is enabled to read data from a first input picture (e.g., the left-eye picture of the video input S_IN') stored in a buffer, and the second display module 804 is enabled to read data from a second input picture (e.g., the right-eye picture of the video input S_IN') stored in the same buffer. In one implementation, the scan line data of an odd scan line read from the first input picture is transmitted during a time period between two successive pulses of the horizontal synchronization signal H-sync referenced for actual video display, and the scan line data of an even scan line read from the second input picture is transmitted during the next time period between two successive pulses of the horizontal synchronization signal H-sync. Because of the alternate transmission of the scan line data read from the first input picture and the scan line data read from the second input picture under the control of the properly generated horizontal synchronization signal H-sync, the video output S_OUT with the desired line-by-line format is generated. Specifically, the first display module 802 obtains a first video data and the second display module 804 obtains a second video data due to the repeated read operation for retrieving the scan line data. It should be noted that scaling may be applied to the data read from the buffers if necessary. In addition, the data scanning clock period may be equal to a time period between two successive pulses of the vertical synchronization signal V-sync referenced for actual video display. The first display module 802 generates a first output picture (e.g., a left-eye picture of the video output S_OUT) according to the first video data, and the second display module 804 generates a second output picture (e.g., a right-eye picture of the video output S_OUT) according to the second video data, where the first output picture and the second output picture are transmitted during one time period between two successive pulses of the vertical synchronization signal V-sync.

In a second exemplary embodiment, the video output device 106 shown in FIG. 1 is realized by the video output device 900 shown in FIG. 9, where the display module 902 is configured to randomly access one buffer in each data scanning clock period. Therefore, during a data scanning clock period, the display module 902 is enabled to perform a random access for reading data from a first input picture (e.g., the left-eye picture of the video input S_IN') stored in a buffer and reading data from a second input picture (e.g., the right-eye picture of the video input S_IN') stored in the same buffer. Similarly, the scan line data of an odd scan line read from the first input picture and the scan line data of an even scan line read from the second input picture are respectively transmitted during successive time periods each between two successive pulses of the horizontal synchronization signal H-sync referenced for actual video display. In this way, the display module 902 obtains a first video data and a second video data due to the repeated read operation for retrieving the scan line data. Please note that scaling should be applied to the data read from the buffers if necessary. In this embodiment, the data scanning clock period may be equal to a time period between two successive pulses of the vertical synchronization signal V-sync referenced for actual video display. In addition, the display module 902 generates a first output picture (e.g., a left-eye picture of the video output S_OUT) according to the first video data, and generates a second output picture (e.g., a right-eye picture of the video output S_OUT) according to the second video data, where the first output picture and the second output picture are transmitted during one time period between two successive pulses of the vertical synchronization signal V-sync.

Figure 43:
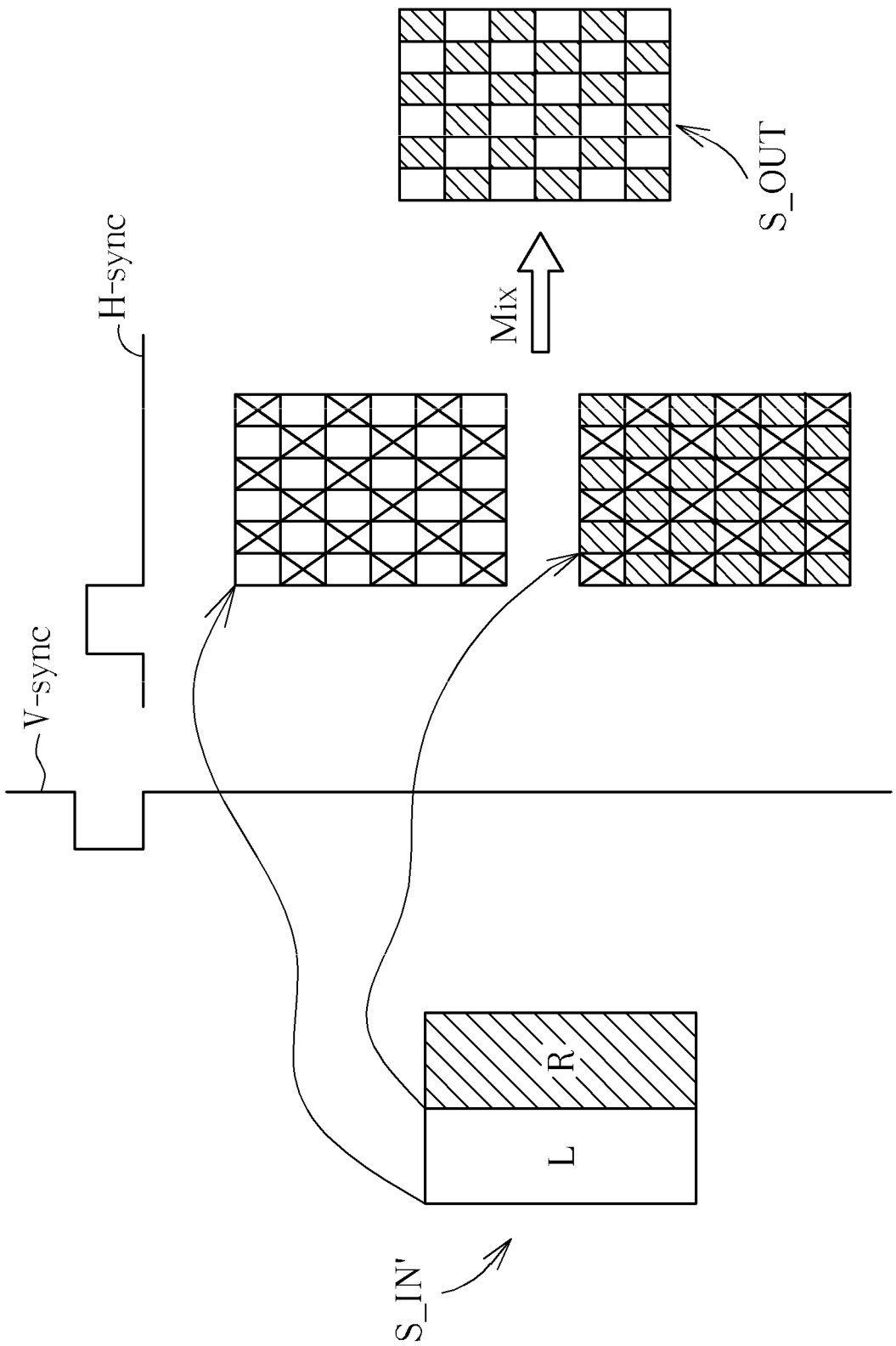
FIG. 43 is a diagram illustrating an exemplary data scanning operation for generating the video output with the checker sampling format according to the video input with the side-by-side format.

FIG. 43 is a diagram illustrating an exemplary data scanning operation for generating the video output with the checker sampling format according to the video input with the side-by-side format. In this exemplary embodiment, the video output device 106 shown in FIG. 1 is realized by the video output device 800 shown in FIG. 8, where the first display module 802 and the second display module 804 can simultaneously access different buffers in one data scanning clock period. Therefore, during a data scanning clock period, the first display module 802 is enabled to read data from a buffer in which a first input picture (e.g., the left-eye picture of the video input S_IN') is stored and accordingly obtain a first video data; in addition, during the same data scanning clock period, the second display module 804 is also enabled to read data stored in the same buffer in which a second input picture (e.g., the right-eye picture of the video input S_IN') is stored and accordingly obtain a second video data. It should be noted that scaling may be applied to the data read from the buffer if necessary. In this embodiment, the data scanning clock period may be equal to a time period between two successive pulses of the vertical synchronization signal V-sync referenced for actual video display. As shown in FIG. 43, the first display module 802 obtains the first video data with a plurality of black areas distributed therein, wherein each black area (i.e., a crossed-out area marked by "X") includes pixels each having no effect on the mixed picture. Similarly, the second display module 804 obtains the second video data with a plurality of black areas distributed therein, wherein each black area (i.e., a crossed-out area marked by "X") includes pixels each having no effect on the mixed picture. The first display module 802 generates a first output picture (e.g., a left-eye picture of the video output S_OUT) according to the first video data, and the second display module 804 generates a second output picture (e.g., a right-eye picture of the video output S_OUT) according to the second video data, where the first video data and the second video data should be properly mixed to thereby generate the video output S_OUT with the desired checker sampling format as shown in FIG. 43. Please note that the black areas have no dominant effect on the mixed result (i.e., the video output S_OUT) in this embodiment.

Figure 44:
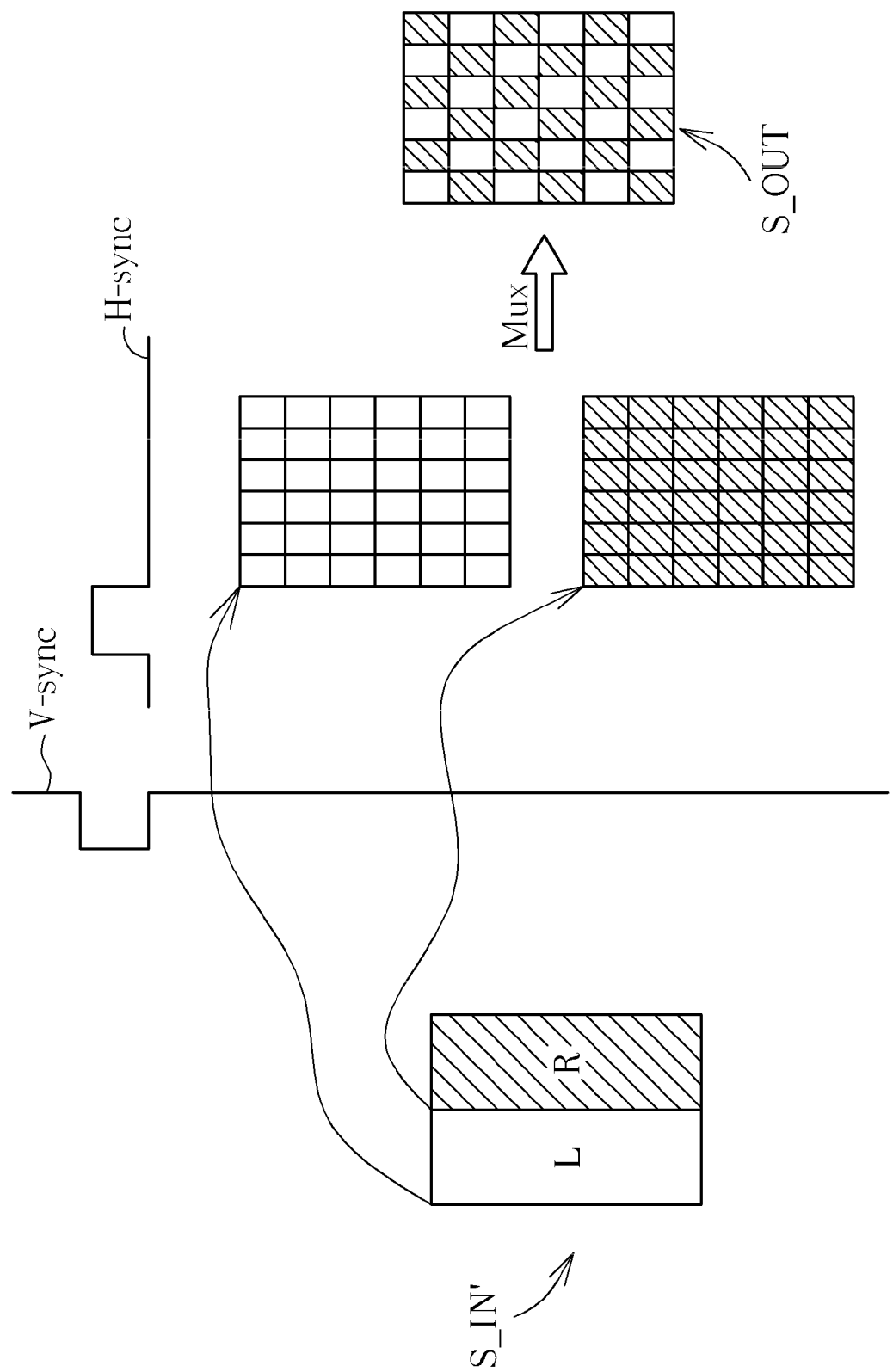
FIG. 44 is a diagram illustrating another exemplary data scanning operation for generating the video output with the checker sampling format according to the video input with the side-by-side format.

FIG. 44 is a diagram illustrating another exemplary data scanning operation for generating the video output with the checker sampling format according to the video input with the side-by-side format. In this exemplary embodiment, the video output device 106 shown in FIG. 1 is realized by the video output device 800 shown in FIG. 8, where the first display module 802 and the second display module 804 can simultaneously access different buffers in one data scanning clock period. Therefore, during a data scanning clock period, the first display module 802 is enabled to read data from a buffer in which a first input picture (e.g., the left-eye picture of the video input S_IN') is stored and accordingly obtain a first video data; in addition, during the same data scanning clock period, the second display module 804 is also enabled to read data stored in the same buffer in which a second input picture (e.g., the right-eye picture of the video input S_IN') is stored and accordingly obtain a second video data. It should be noted that scaling may be applied to the data read from the buffers if necessary. In this embodiment, the data scanning clock period may be equal to a time period between two successive pulses of the vertical synchronization signal V-sync referenced for actual video display. Next, the first display module 802 generates a first output picture (e.g., a left-eye picture of the video output S_OUT) according to the first video data, and the second display module 804 generates a second output picture (e.g., a right-eye picture of the video output S_OUT) according to the second video data, where the first video data and the second video data should be properly multiplexed to thereby generate the video output S_OUT with the desired checker sampling format. For example, the first display module 802 and the second display module 804 obtain the first video data and the second video data according to a slower data rate; however, the first display module 802 and the second display module 804 output the first video data and the second video data according to a faster data rate used for multiplexing the output of the first video data and the second video data. For example, in one clock cycle of a reference clock, only the first display module 802 is allowed to output data; however, in the next clock cycle of the reference clock, only the second display module 804 is allowed to output data.

Figure 22:
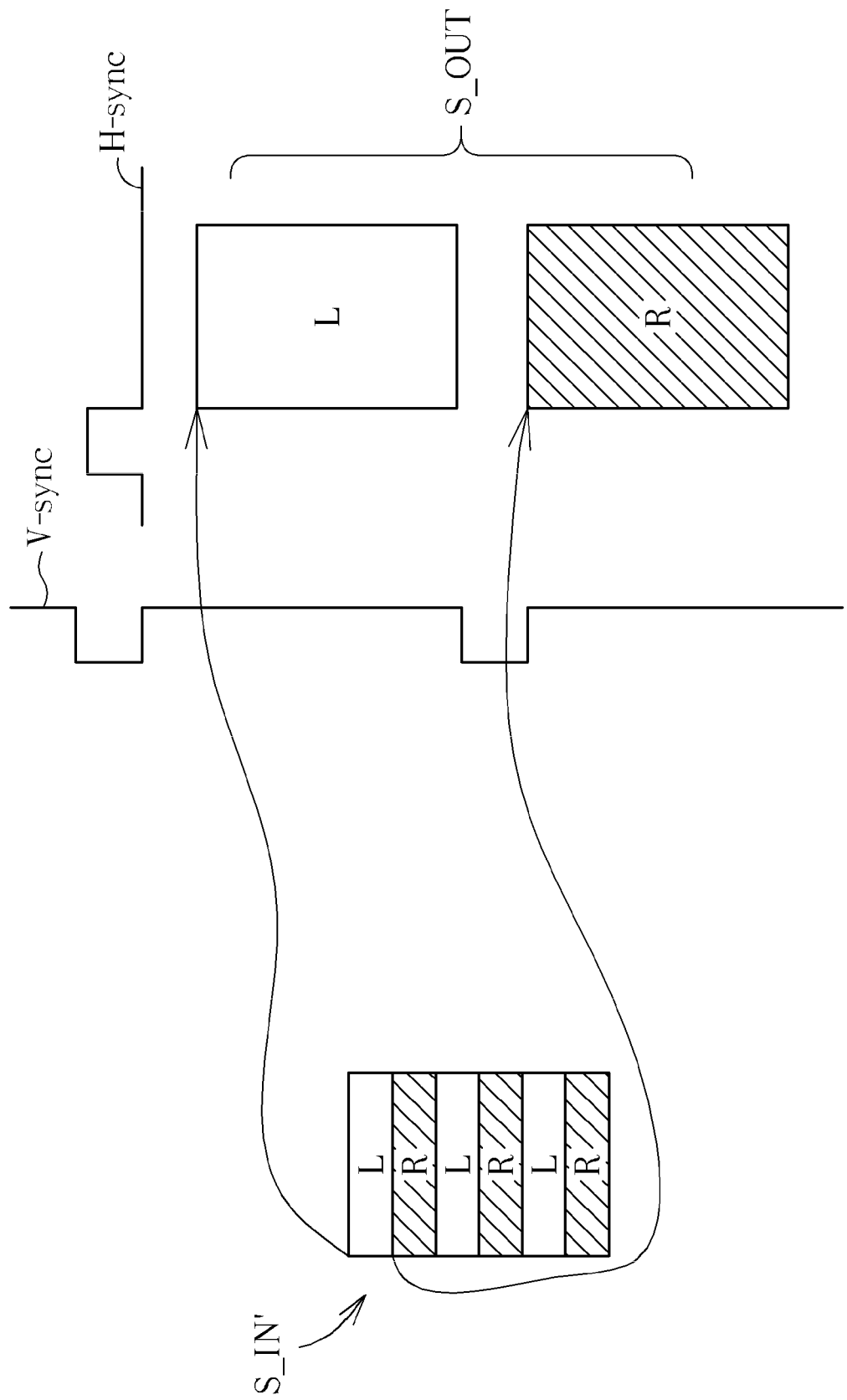
FIG. 22 is a diagram illustrating an exemplary data scanning operation for generating the video output with the frame/field sequential format according to the video input with the line-by-line format.
Figure 23:
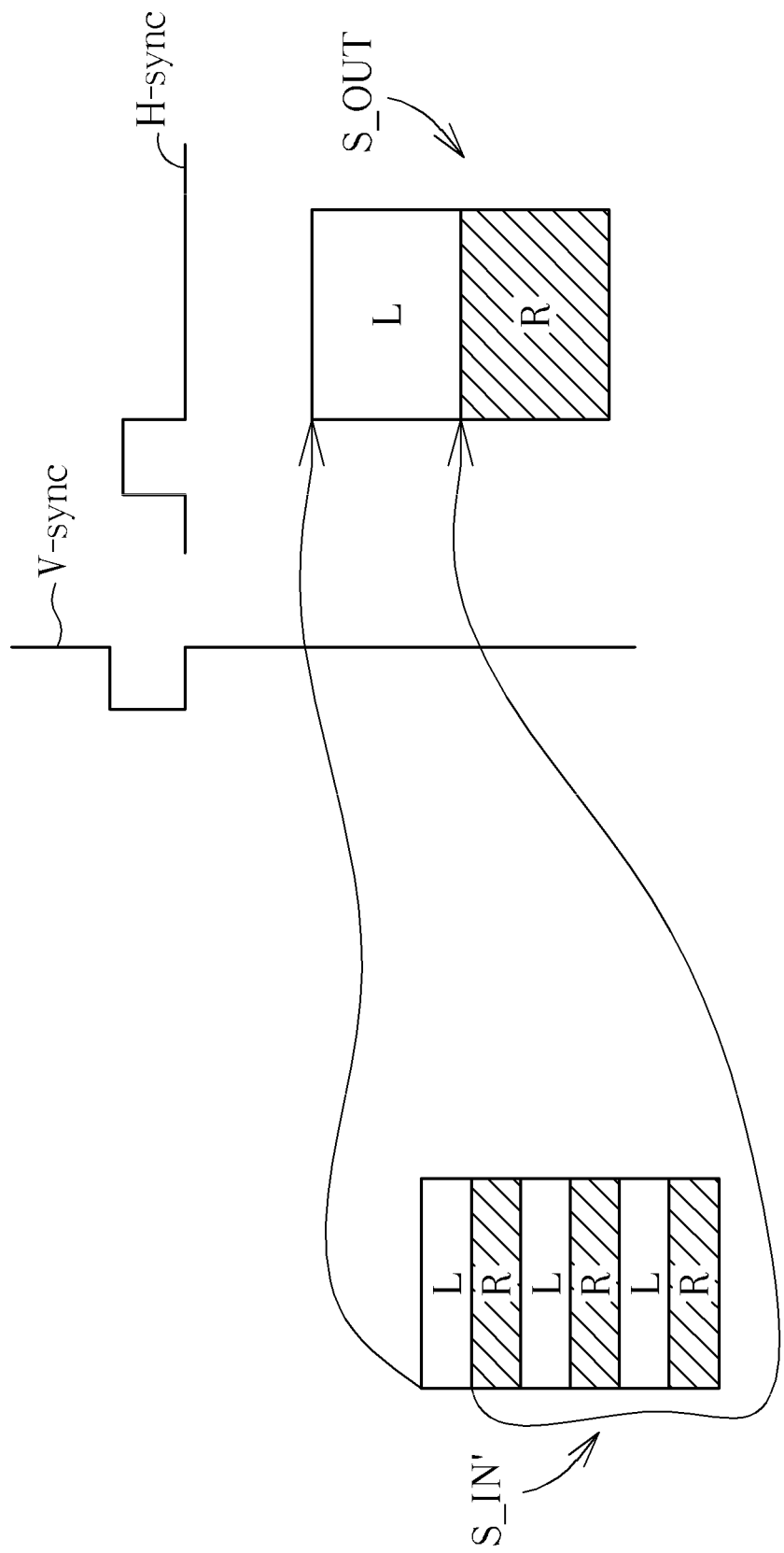
FIG. 23 is a diagram illustrating an exemplary data scanning operation for generating the video output with the top-and-bottom format according to the video input with the line-by-line format.
Figure 24:
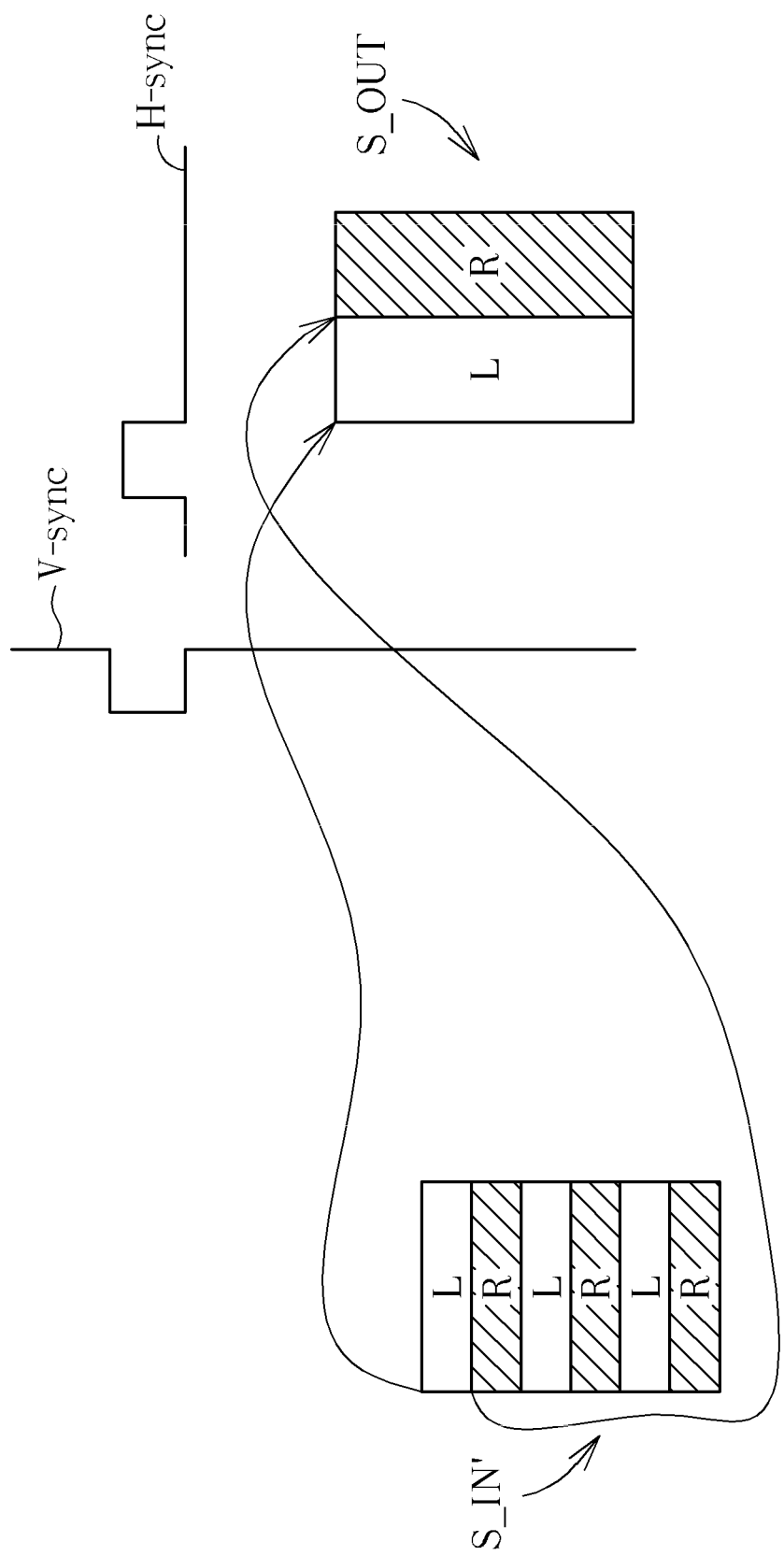
FIG. 24 is a diagram illustrating an exemplary data scanning operation for generating the video output with the side-by-side format according to the video input with the line-by-line format.
Figure 25:
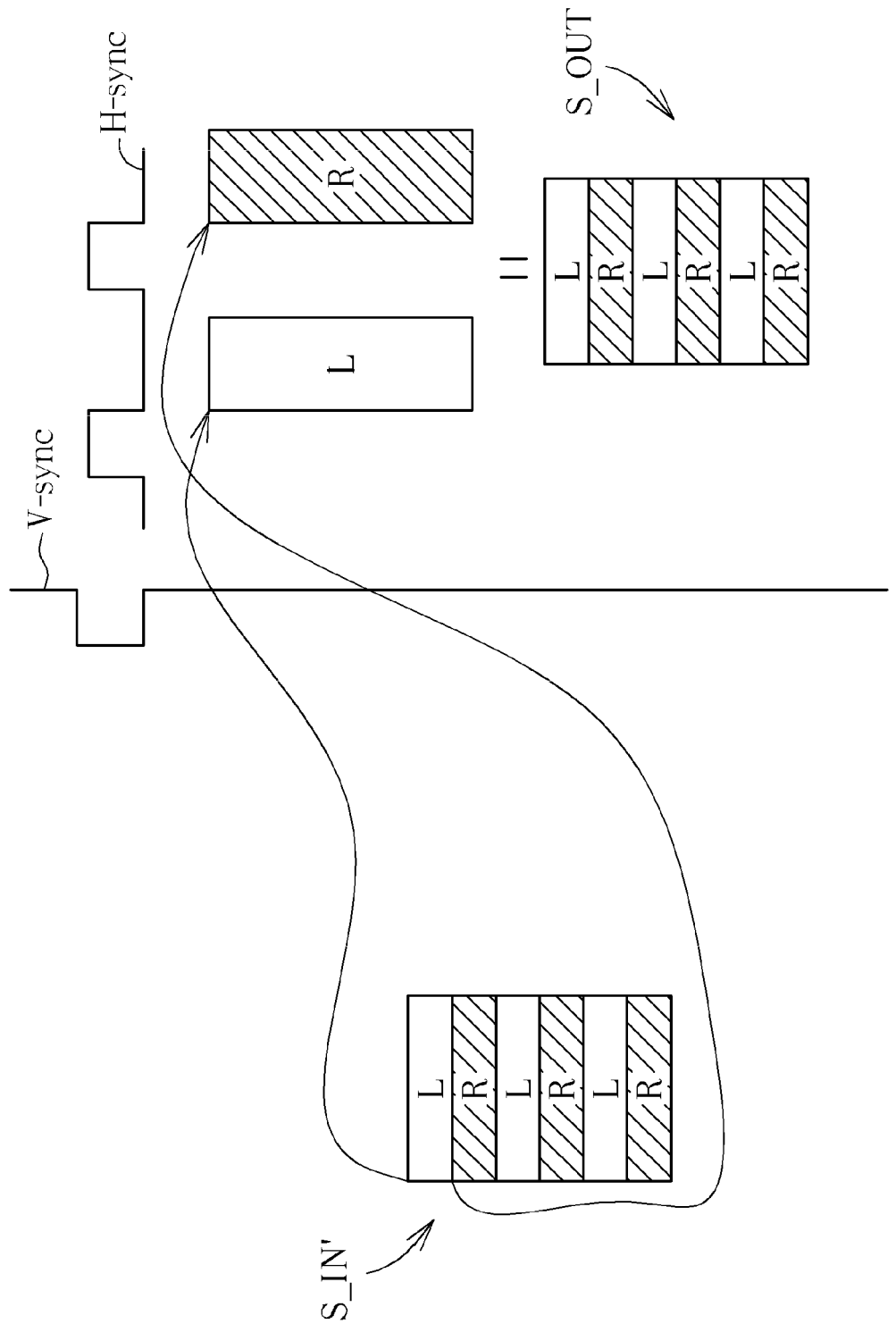
FIG. 25 is a diagram illustrating an exemplary data scanning operation for generating the video output with the line-by-line format according to the video input with the line-by-line format.
Figure 45:
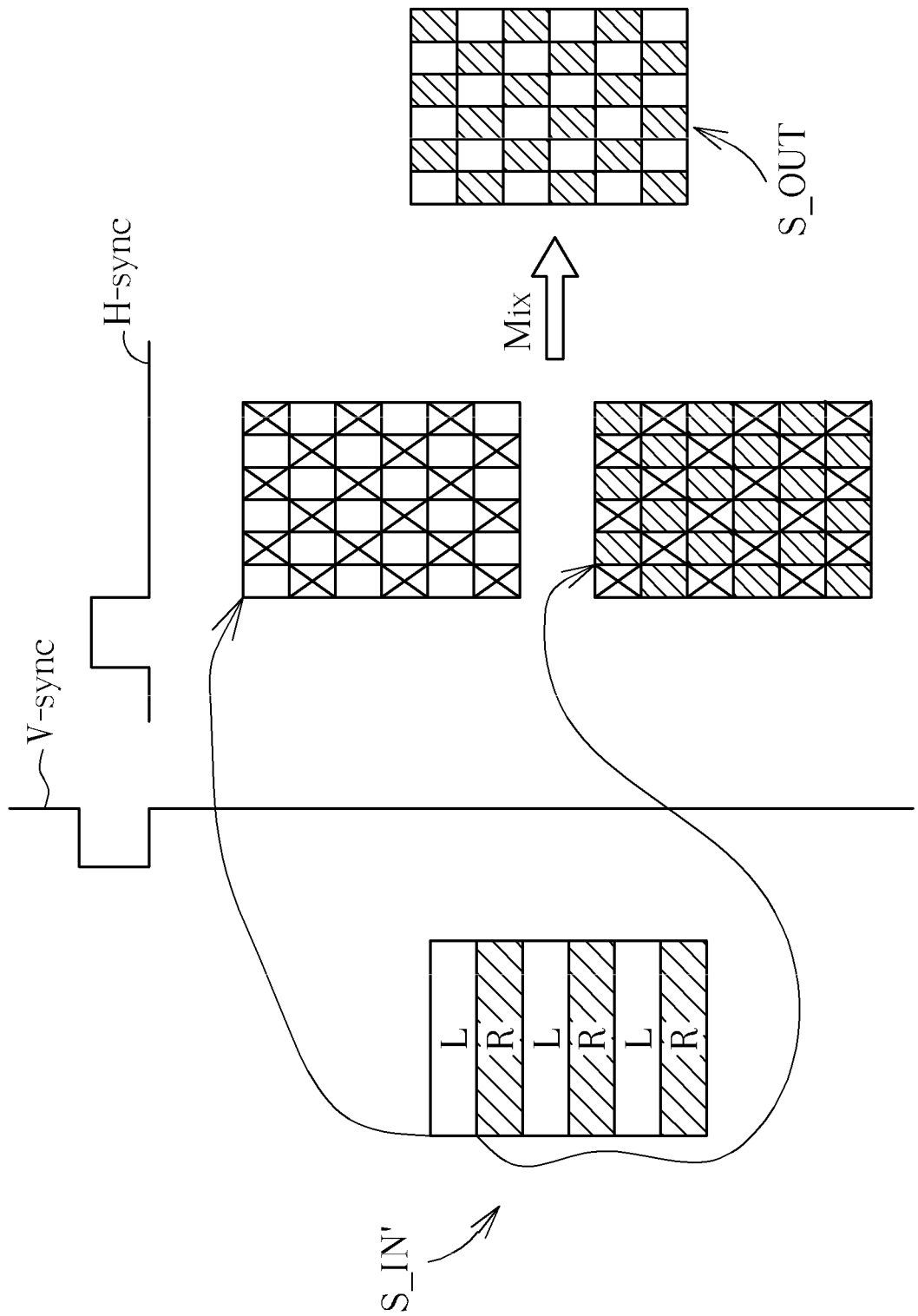
FIG. 45 is a diagram illustrating an exemplary data scanning operation for generating the video output with the checker sampling format according to the video input with the line-by-line format.
Figure 46:
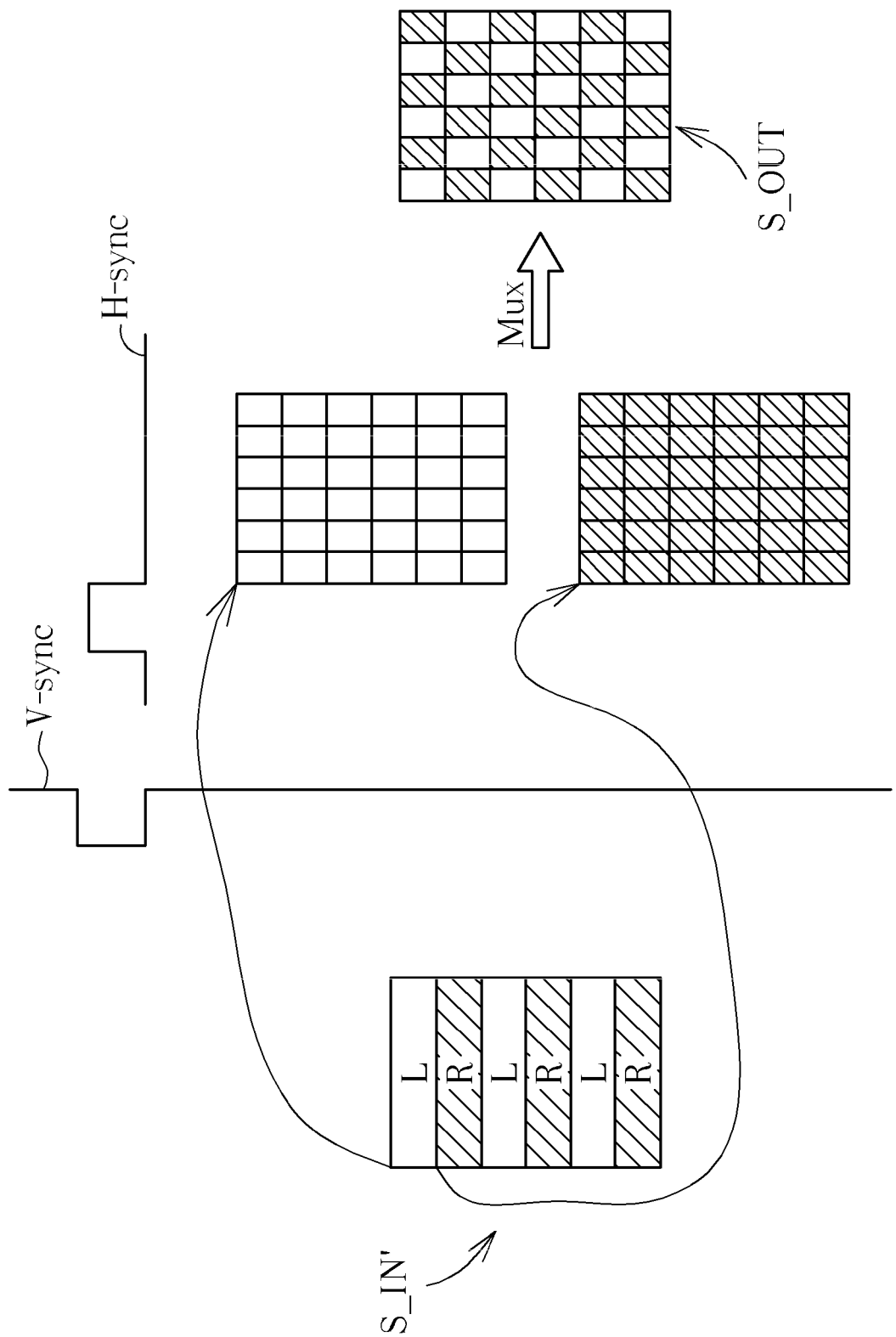
FIG. 46 is a diagram illustrating another exemplary data scanning operation for generating the video output with the checker sampling format according to the video input with the line-by-line format.

FIG. 22 is a diagram illustrating an exemplary data scanning operation for generating the video output with the frame/field sequential format according to the video input with the line-by-line format. FIG. 23 is a diagram illustrating an exemplary data scanning operation for generating the video output with the top-and-bottom format according to the video input with the line-by-line format. FIG. 24 is a diagram illustrating an exemplary data scanning operation for generating the video output with the side-by-side format according to the video input with the line-by-line format. FIG. 25 is a diagram illustrating an exemplary data scanning operation for generating the video output with the line-by-line format according to the video input with the line-by-line format. FIG. 45 is a diagram illustrating an exemplary data scanning operation for generating the video output with the checker sampling format according to the video input with the line-by-line format. FIG. 46 is a diagram illustrating another exemplary data scanning operation for generating the video output with the checker sampling format according to the video input with the line-by-line format. As mentioned above, the storage arrangement for the video input S_IN' with the side-by-side format is identical to that of the video input S_IN' with the line-by-line format. Therefore, a person skilled in the art can readily understand details of the exemplary data scanning operations shown in FIG. 22-FIG. 25 and FIG. 45-FIG. 46 after reading above paragraphs directed to exemplary data scanning operations shown in FIG. 18-FIG. 21 and FIG. 43-FIG. 44. Further description is therefore omitted here for brevity.

Figure 26:
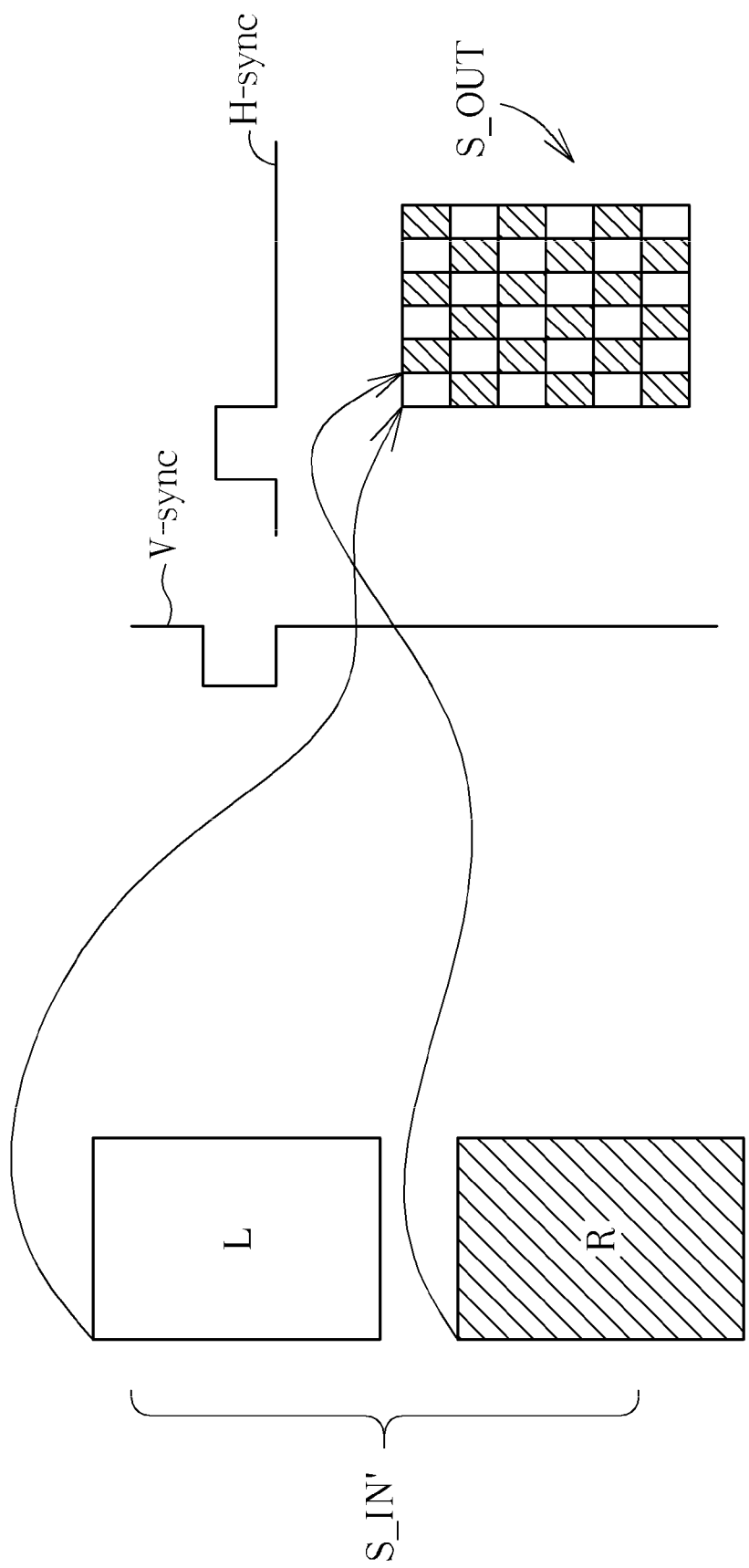
FIG. 26 is a diagram illustrating an exemplary data scanning operation for generating the video output with the checker sampling format according to the video input with the frame/field sequential format.
Figure 27:
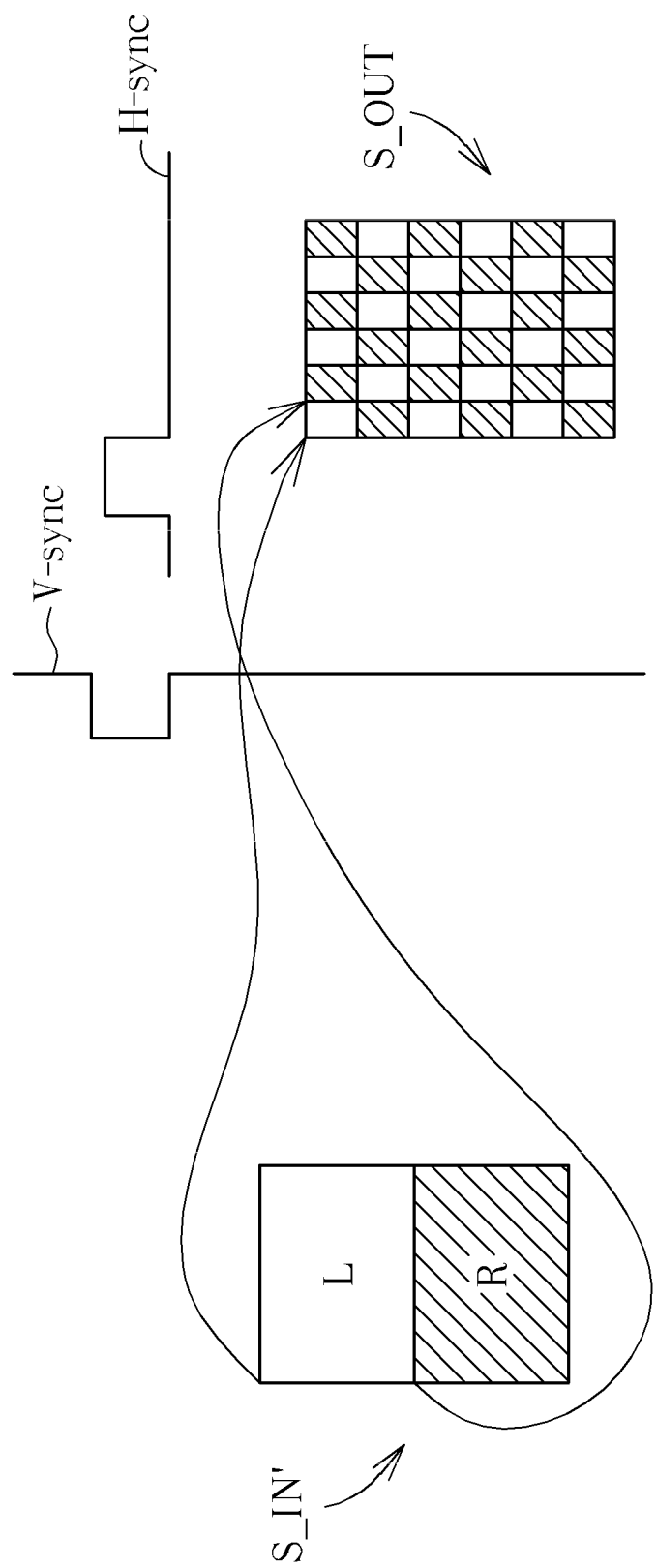
FIG. 27 is a diagram illustrating an exemplary data scanning operation for generating the video output with the checker sampling format according to the video input with the top-and-bottom format.
Figure 28:
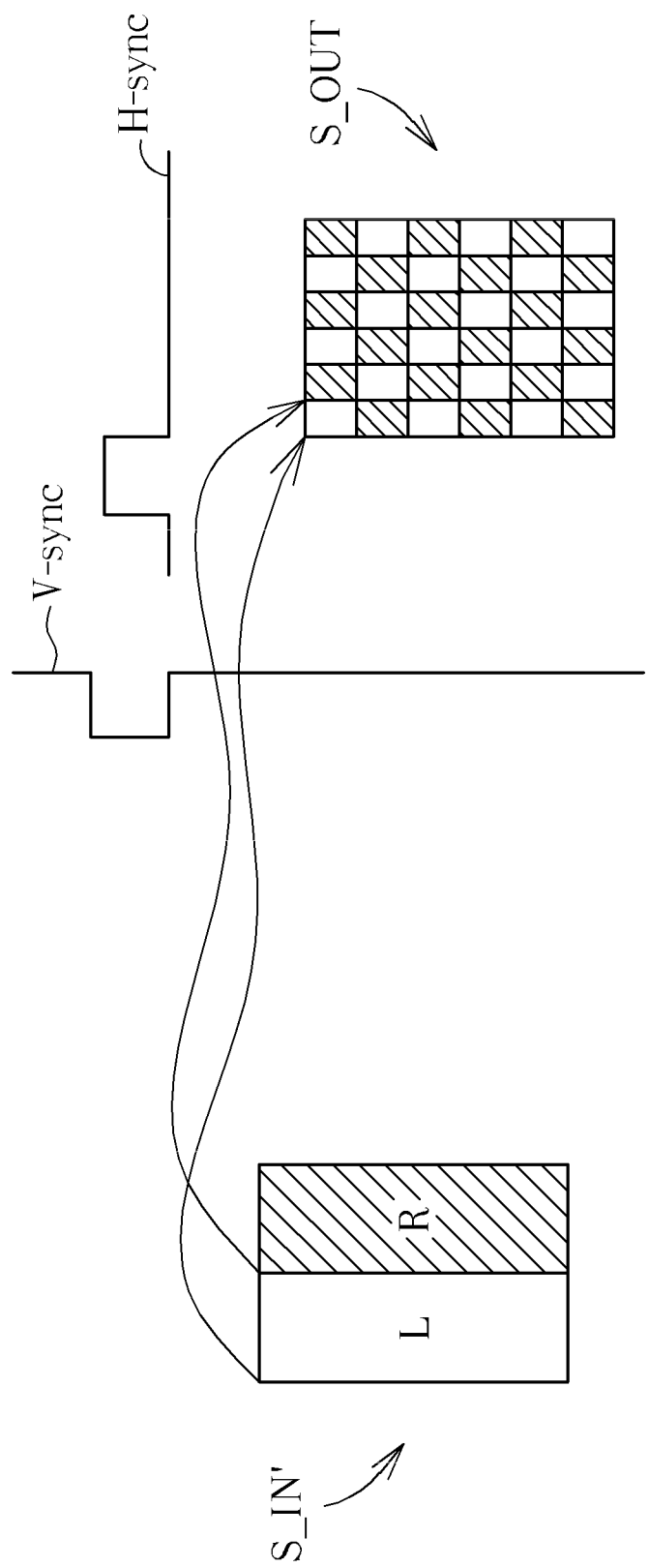
FIG. 28 is a diagram illustrating an exemplary data scanning operation for generating the video output with the checker sampling format according to the video input with the side-by-side format.
Figure 29:
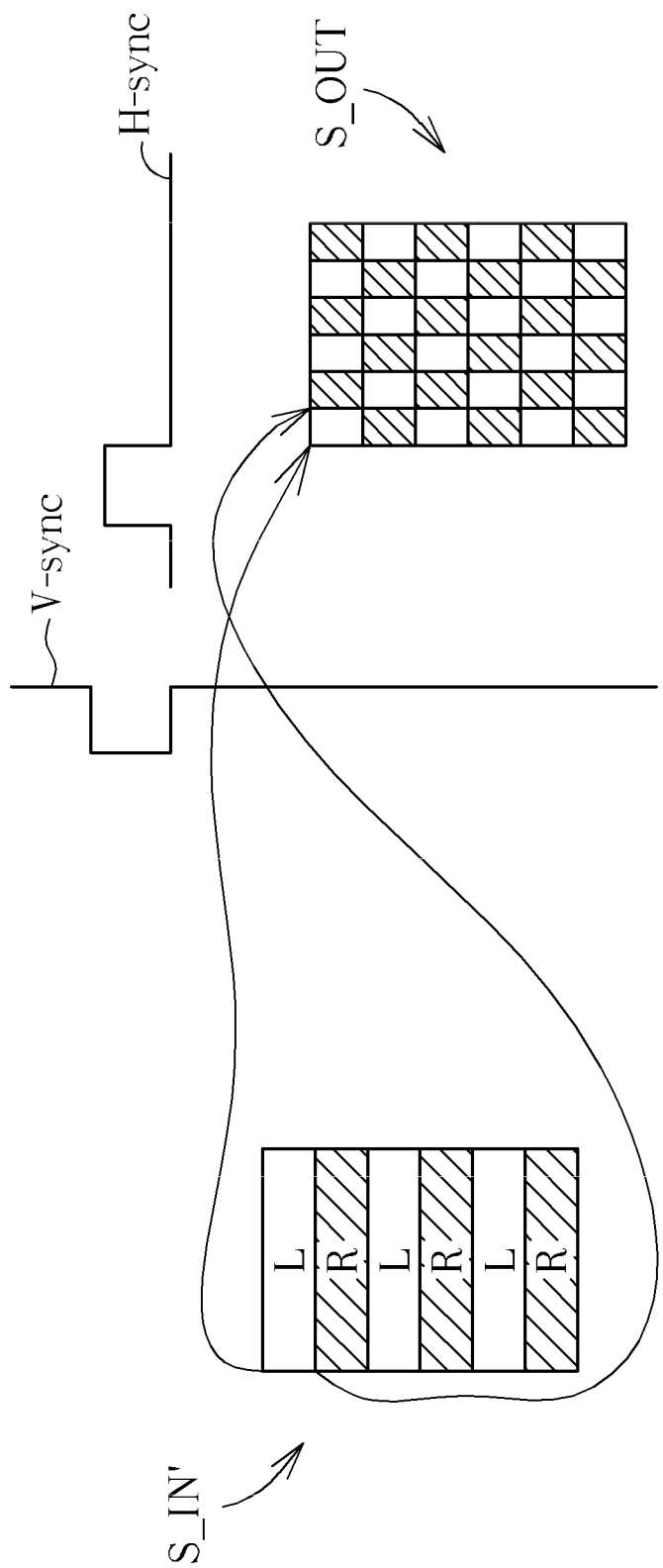
FIG. 29 is a diagram illustrating an exemplary data scanning operation for generating the video output with the checker sampling format according to the video input with the line-by-line format.
Figure 30:
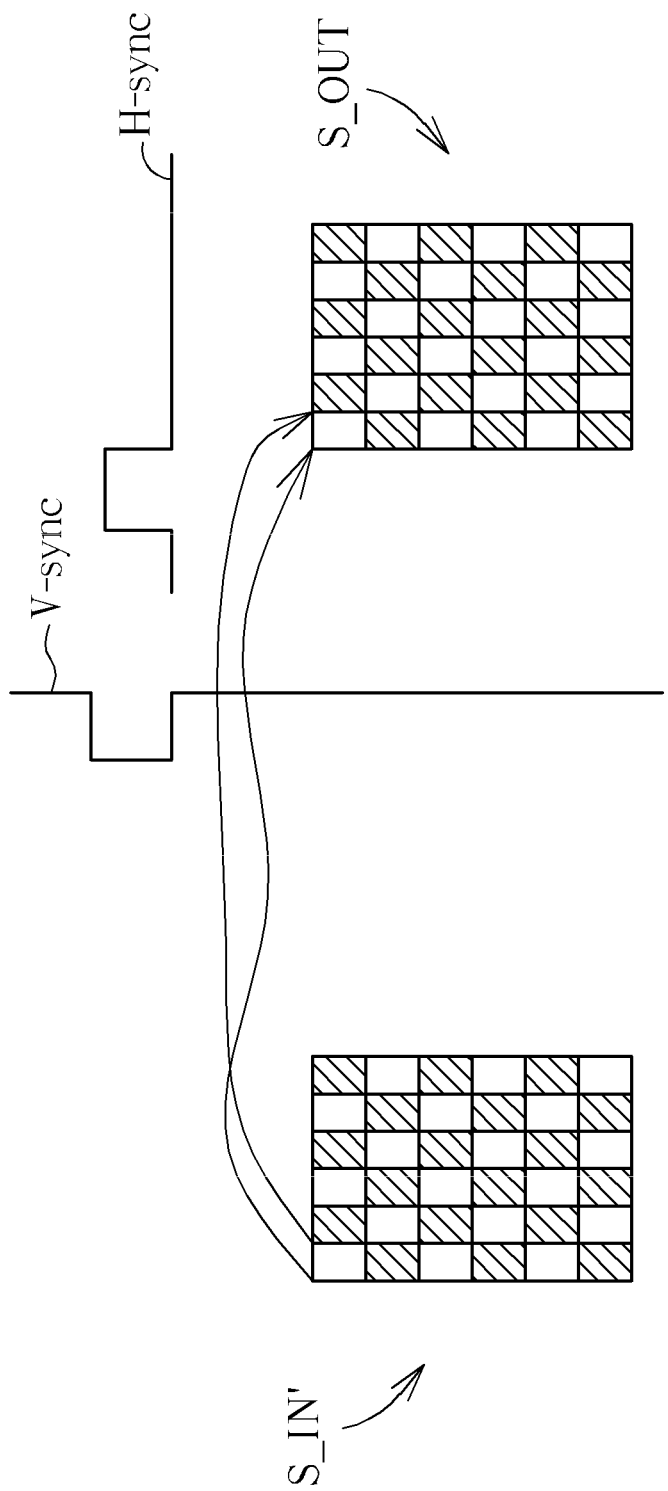
FIG. 30 is a diagram illustrating an exemplary data scanning operation for generating the video output with the checker sampling format according to the video input with the checker sampling format.
Figure 31:
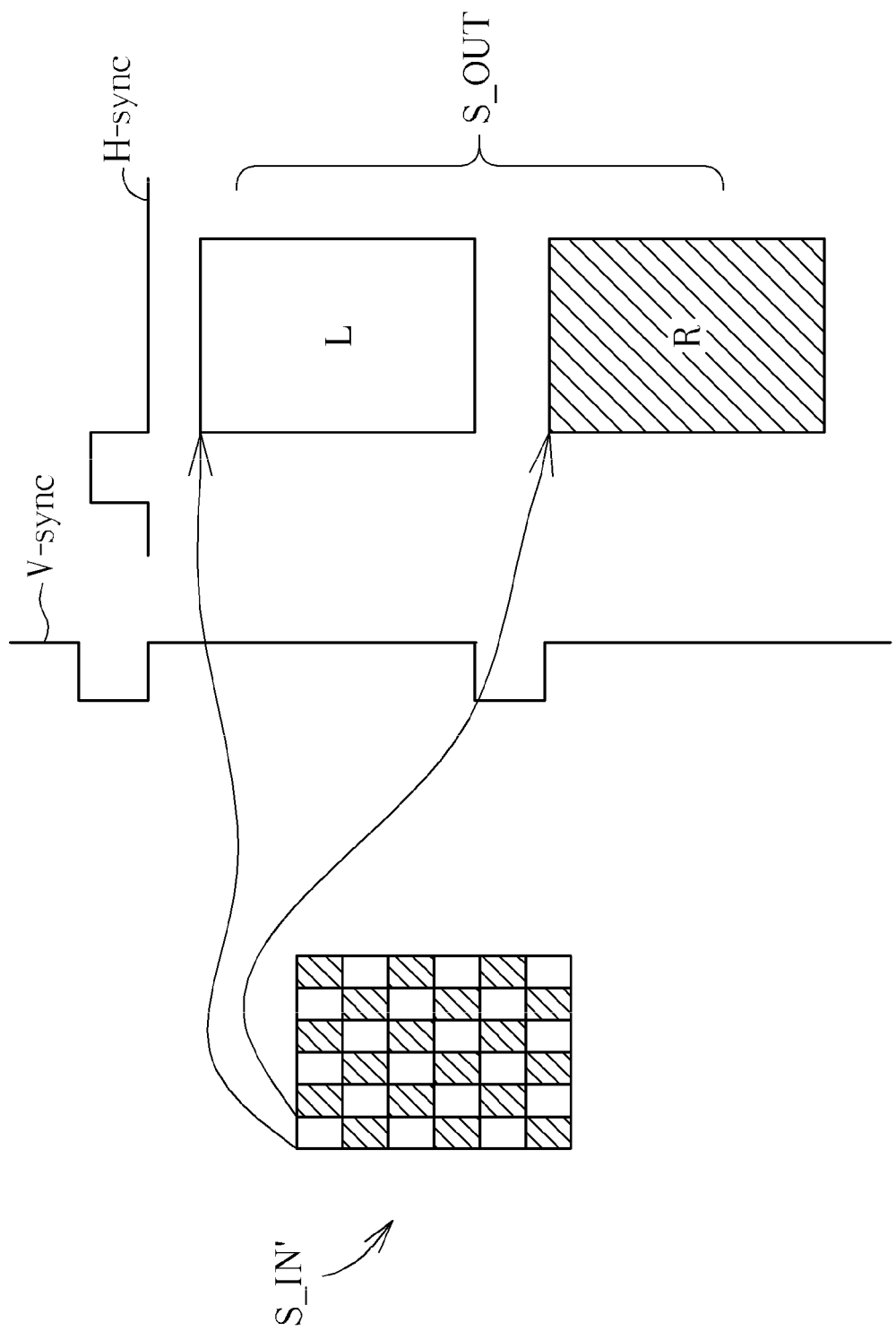
FIG. 31 is a diagram illustrating an exemplary data scanning operation for generating the video output with the frame/field sequential format according to the video input with the checker sampling format.
Figure 32:
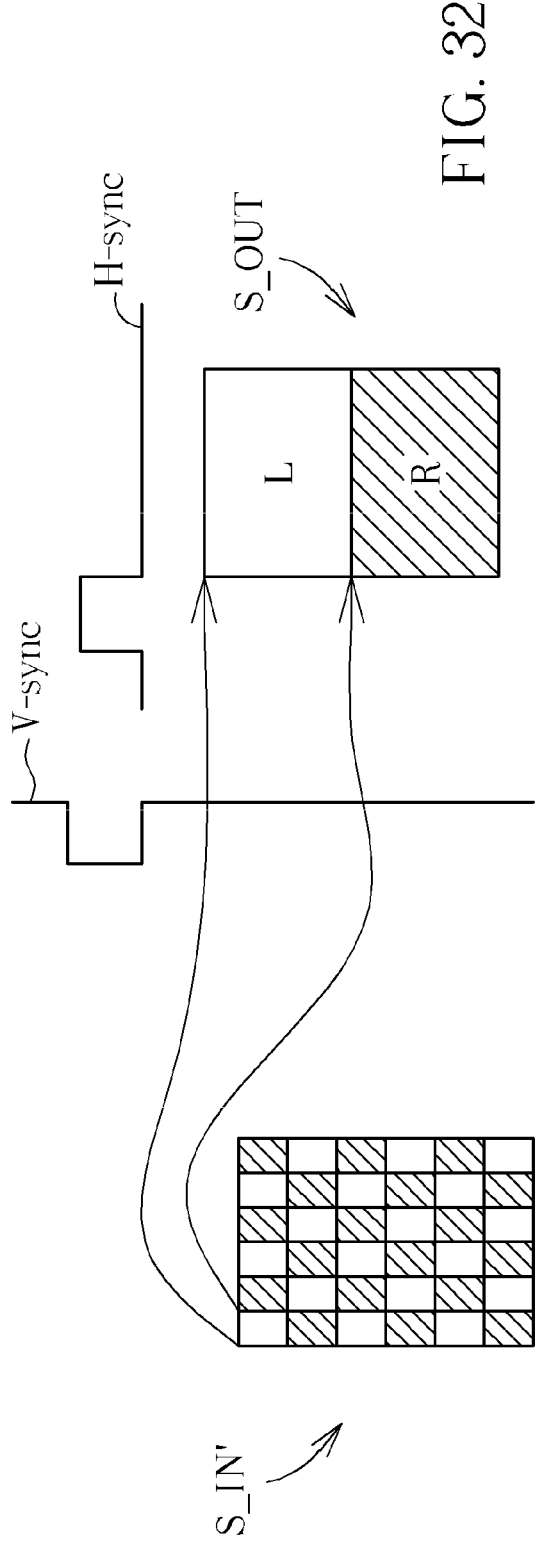
FIG. 32 is a diagram illustrating an exemplary data scanning operation for generating the video output with the top-and-bottom format according to the video input with the checker sampling format.
Figure 33:
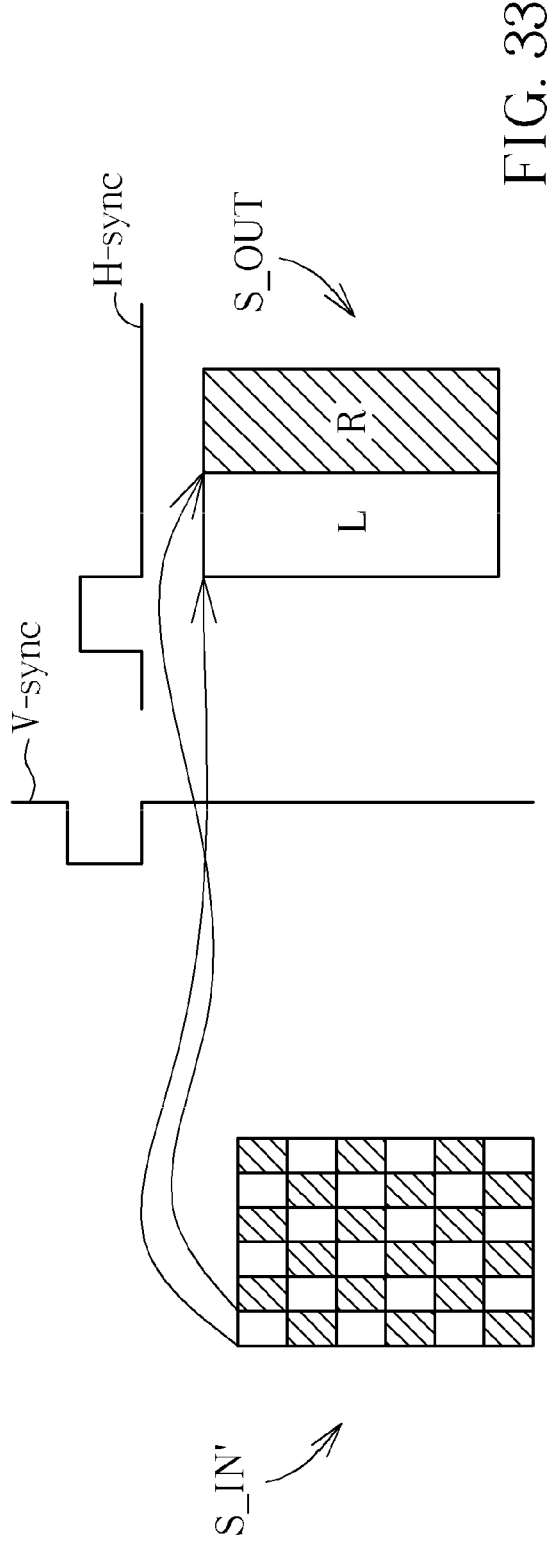
FIG. 33 is a diagram illustrating an exemplary data scanning operation for generating the video output with the side-by-side format according to the video input with the checker sampling format.
Figure 34:
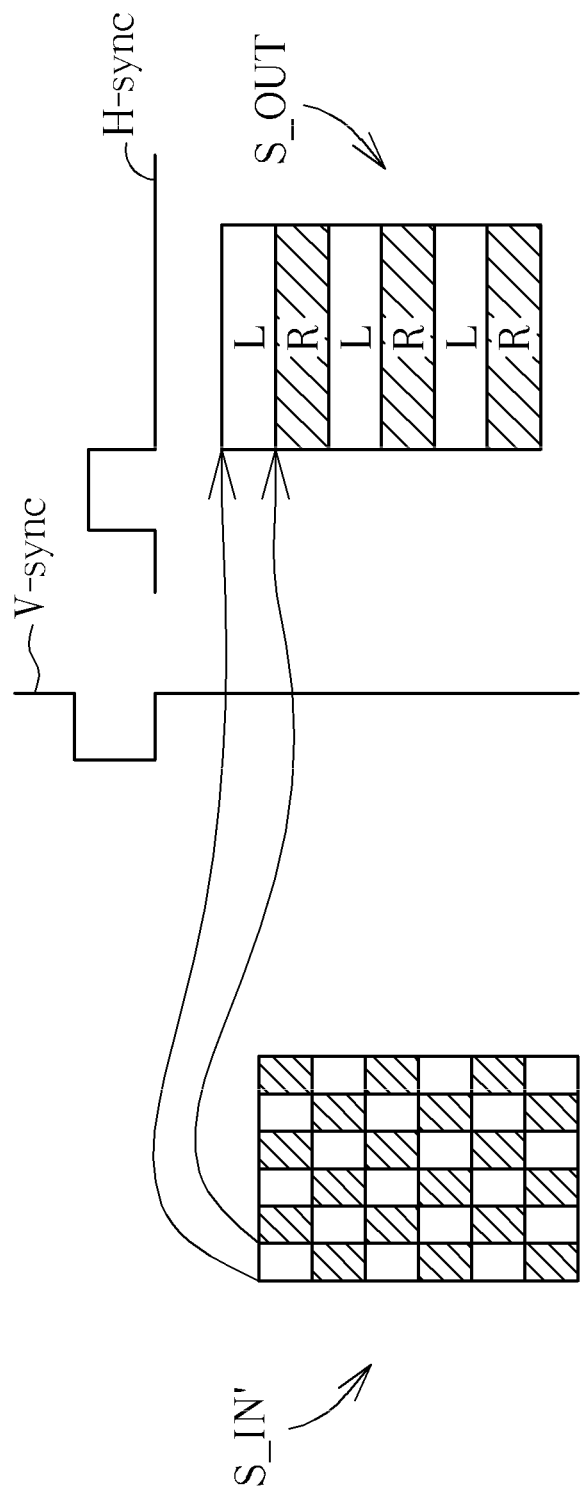
FIG. 34 is a diagram illustrating an exemplary data scanning operation for generating the video output with the line-by-line format according to the video input with the checker sampling format.

FIG. 26 is a diagram illustrating an exemplary data scanning operation for generating the video output with the checker sampling format according to the video input with the frame/field sequential format. FIG. 27 is a diagram illustrating an exemplary data scanning operation for generating the video output with the checker sampling format according to the video input with the top-and-bottom format. FIG. 28 is a diagram illustrating an exemplary data scanning operation for generating the video output with the checker sampling format according to the video input with the side-by-side format. FIG. 29 is a diagram illustrating an exemplary data scanning operation for generating the video output with the checker sampling format according to the video input with the line-by-line format. FIG. 30 is a diagram illustrating an exemplary data scanning operation for generating the video output with the checker sampling format according to the video input with the checker sampling format. FIG. 31 is a diagram illustrating an exemplary data scanning operation for generating the video output with the frame/field sequential format according to the video input with the checker sampling format. FIG. 32 is a diagram illustrating an exemplary data scanning operation for generating the video output with the top-and-bottom format according to the video input with the checker sampling format. FIG. 33 is a diagram illustrating an exemplary data scanning operation for generating the video output with the side-by-side format according to the video input with the checker sampling format. FIG. 34 is a diagram illustrating an exemplary data scanning operation for generating the video output with the line-by-line format according to the video input with the checker sampling format. Regarding these exemplary data scanning operations, the video output device 106 shown in FIG. 1 is realized by the video output device 900 shown in FIG. 9, where the display module 902 is configured to randomly access buffer(s) in each data scanning clock period. Therefore, the display module 902 is enabled to perform a random access for reading data from a first input picture (e.g., the left-eye picture of the video input S_IN') stored in a buffer and reading data from a second input picture (e.g., the right-eye picture of the video input S_IN') stored in the same buffer or another buffer, and accordingly obtains a first video data and a second video data. Please note that scaling should be applied to the data read from the buffer(s) if necessary. In addition, the display module 902 generates a first output picture (e.g., a left-eye picture of the video output S_OUT) according to the first video data, and generates a second output picture (e.g., a right-eye picture of the video output S_OUT) according to the second video data, where the first output picture and the second output picture are transmitted during one time period between two successive pulses of the vertical synchronization signal V-sync.

Figure 35:
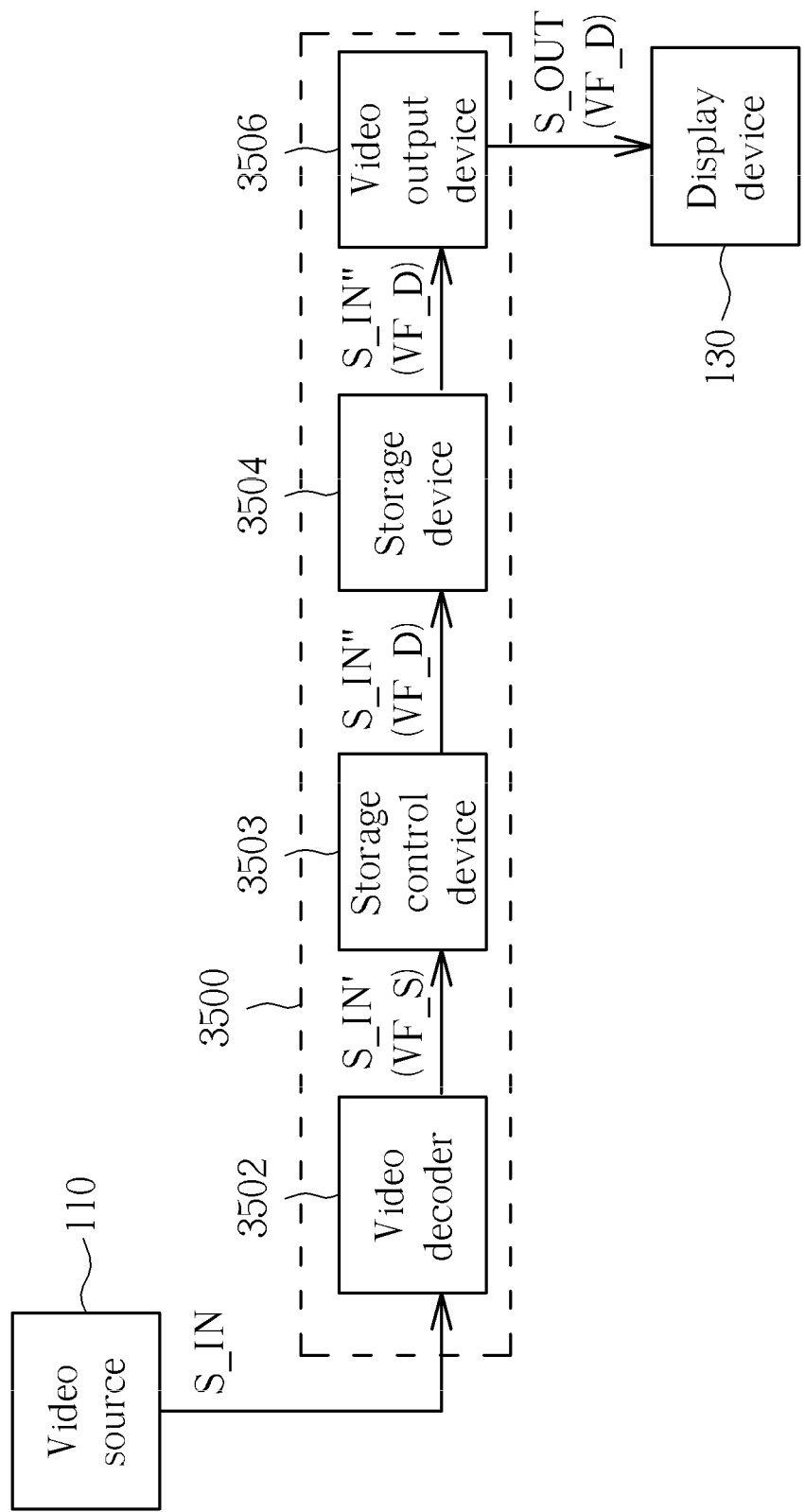
FIG. 35 is a diagram illustrating a video processing apparatus according to a second exemplary embodiment of the present invention.

FIG. 35 is a diagram illustrating a video processing apparatus according to a second exemplary embodiment of the present invention. The exemplary video processing apparatus 3500 includes, but is not limited to, a video decoder 3502, a storage control device 3503, a storage device 3504, and a video output device 3506. As shown in FIG. 35, a video input S_IN' is generated from the video decoder 3502 decoding an encoded video input S_IN provided by a video source 110 such as an optical disc. In other words, the encoded video input S_IN provided by the video source 110 has encoded pictures, and the video input S_IN' generated from the video decoder 3502 contains reconstructed/decoded pictures to be displayed. Therefore, the video input S_IN' derived from decoding the encoded video input S_IN has a source video format VF_S. The storage control device 3503 is disposed between the preceding video decoder 3502 and the following storage device 3504, and used for generating a video input S_IN" with a display video format VF_D to the storage device 3504. By way of example, but not limitation, the storage control device 3503 and the video decoder 3502 may be integrated with a single decoder chip. Regarding the storage device 3504, it may be implemented using a dynamic random access memory (DRAM), and is used to buffer the video input S_IN". In this exemplary embodiment, the storage control device 3503 is arranged to directly store a decoded data into the following storage device 3504 upon receiving the decoded data generated from the video decoder 3502. In other words, the output of the video decoder 3502 is not stored into one data buffer before stored into another data buffer (i.e., the storage device 3504). The video output device 3506 is coupled to the storage device 3504, and is implemented for outputting a video output S_OUT to a display device (e.g., 3D display device) 130 according to the video input S_IN" buffered in the storage device 3504.

In one exemplary embodiment of the present invention, the video processing apparatus 3500 may be disposed in a video playback device (e.g., an optical disc player or a set-top box) external to the display device 130, and the video processing apparatus 3500 is therefore coupled to the display device 130 through a connection cable such as a high-definition multimedia interface (HDMI) cable. However, this is for illustrative purposes only. In an alternative design, the video processing apparatus 3500 and the display device 130 may be integrated within a single electronic device.

Figure 36:
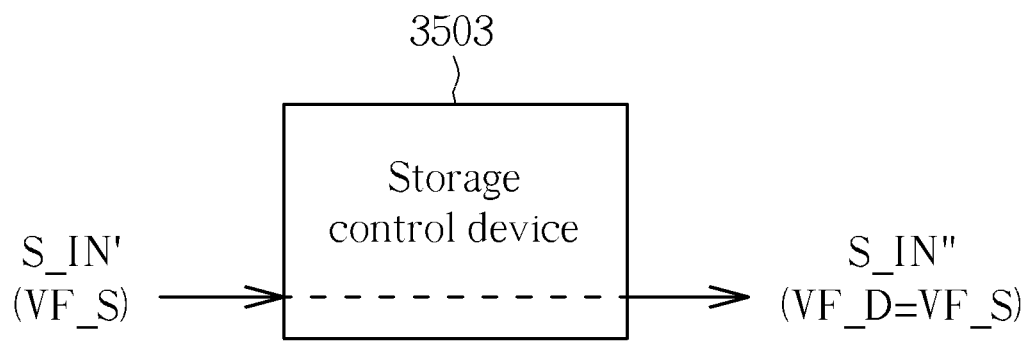
FIG. 36 is a diagram illustrating a first operational scenario of generating another video input according to one video input generated from a video decoder.

Please refer to FIG. 36, which is a diagram illustrating a first operational scenario of generating the video input S_IN" according to the video input S_IN' generated from the video decoder 3502. When the video input S_IN' is a 3D video with the source video format VF_S, and the display device 130 is a 3D display device supporting the display video format VF_D identical to the source video format VF_S, the storage control device 3503 is blocked from performing any format conversion upon the video input S_IN' generated from the video decoder 3502. Therefore, the video input S_IN' is bypassed and directly serves as the video output S_IN" buffered in the storage device 3504.

Figure 37:
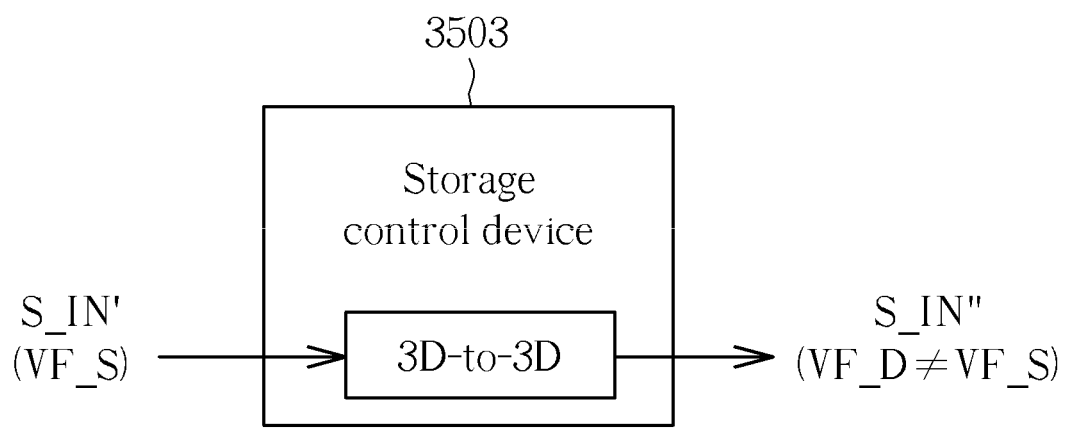
FIG. 37 is a diagram illustrating a second operational scenario of generating another video input according to one video input generated from a video decoder.

The video input S_IN' which is a 3D video may have a video format being one of a plurality of 3D video formats including the frame/field sequential format, the side-by-side format, the line-by-line format, the top-and-bottom format, and the checker sampling format. In addition, the display device 130 which is a 3D display device may be configured to support a video format being one of the above-mentioned 3D video formats. If the 3D video format of the video input S_IN' is identical to the 3D video format supported by the display device 130, no format conversion is required, as shown in FIG. 36. However, if the 3D video format of the video input S_IN' is not identical to the 3D video format supported by the display device 130, a 3D-to-3D format conversion is enabled. Please refer to FIG. 37, which is a diagram illustrating a second operational scenario of generating the video input S_IN" according to the video input S_IN' generated from the video decoder 3502. The output of the display device 130 allows the viewer to have the 3D viewing experience though the original video input S_IN' has a video format not complying with the display capability of the display device 130.

The operation of the storage control device 3503 shown in FIG. 35 is similar to that of the video output device 106 shown in FIG. 1. Specifically, the video output S_OUT generated by the video output device 106 and the stored video input S_IN" both have the display video format VF_D supported by the display capability of the display device 130. The major difference therebetween is that no vertical synchronization signal and horizontal synchronization signal is taken into consideration when the storage control device 3503 generates the video input S_IN" to the storage device 3504. As a person skilled in the art can readily understand the relation between the video input S_IN with the source video format VF_S and another video input S_IN" with the display video format VF_D by referring to the exemplary video inputs S_IN and the corresponding exemplary video outputs S_OUT shown in FIG. 9-FIG. 34 and FIG. 39-FIG. 46, further description is therefore omitted here for brevity.

Figure 38:
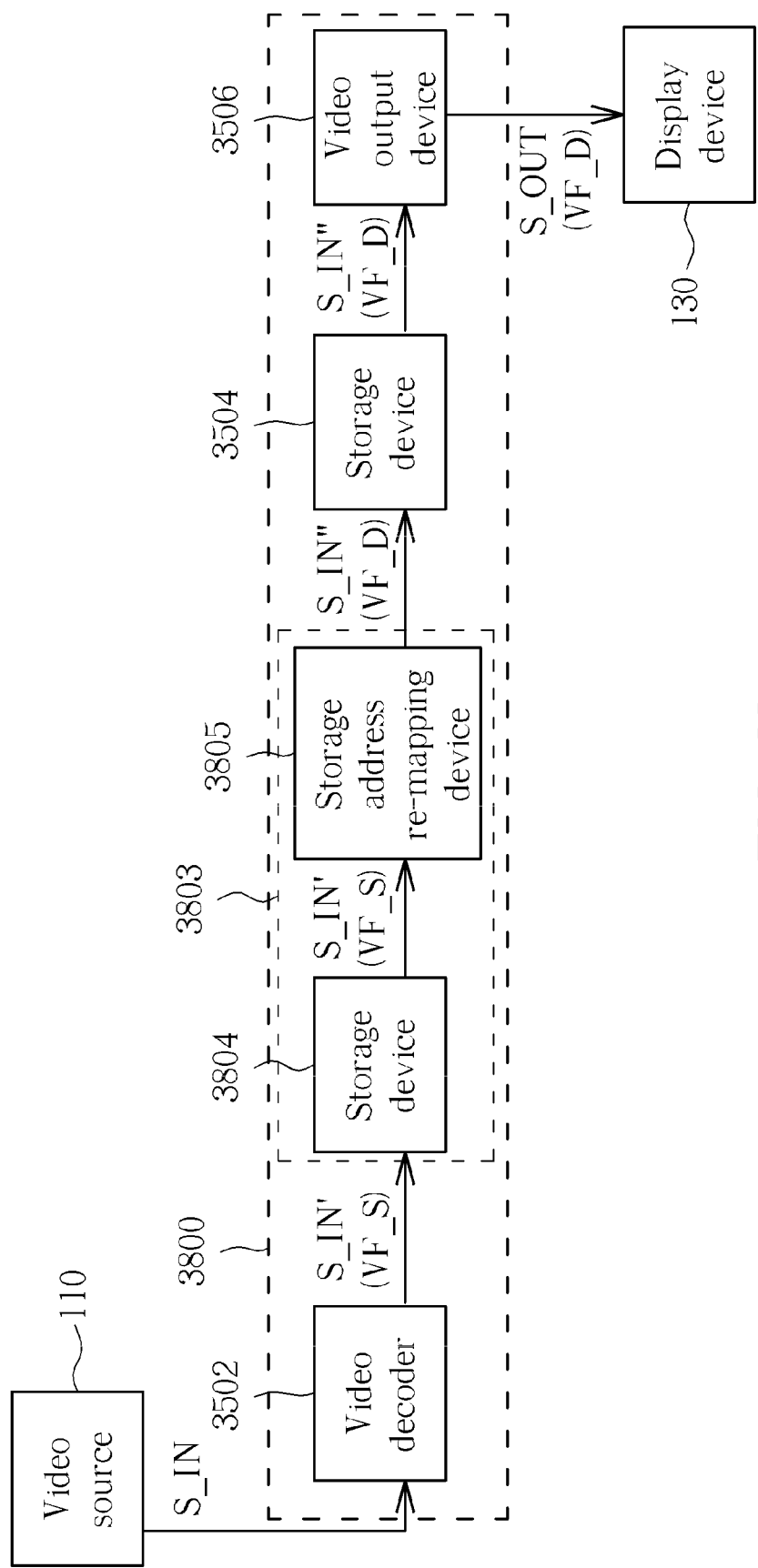
FIG. 38 is a diagram illustrating a video processing apparatus according to a third exemplary embodiment of the present invention.

FIG. 38 is a diagram illustrating a video processing apparatus according to a third exemplary embodiment of the present invention. The exemplary video processing apparatus 3800 in FIG. 38 is similar to the exemplary video processing apparatus 3500 in FIG. 35. The major difference therebetween is that the video processing apparatus 3800 has a storage control device 3803 realized by a storage address re-mapping device 3805 and an additional storage device (e.g., a DRAM buffer) 3804. The storage device 3804 is coupled to the video decoder 3505 and implemented for buffering the video input S_IN' generated from the video decoder 3502. Therefore, the output of the video decoder 3502 is stored into one data buffer (e.g., the storage device 3804) before stored into another data buffer (i.e., the storage device 3504). The storage address re-mapping device 3805 is coupled between the storage devices 3804 and 3504, and used for re-mapping storage addresses of the video input S_IN' buffered in the storage device 3804 to the other storage device 3504, and accordingly storing the video input S_IN" with the video display format VF_D in the storage devices 3504. The same objective of having the video input S_IN" buffered in the storage device 3504 is achieved. In addition, as a person skilled in the art can readily understand the relation between the video input S_IN with the source video format VF_S and another video input S_IN" with the display video format VF_D by referring to the exemplary video inputs S_IN and the corresponding exemplary video outputs S_OUT shown in FIG. 9-FIG. 34 and FIG. 39-FIG. 46, further description is therefore omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing apparatus, comprising:
   a video decoder, for decoding an encoded video input to generate a first video input with a source video format;
   a first storage device;
   a storage control device, coupled between the video decoder and the first storage device, for generating a second video input with a display video format to the first storage device according to the first video input with the source video format; and
   a video output device, coupled to the first storage device, for outputting a video output to a display device according to the second video input buffered in the first storage device, wherein the video output has the display video format satisfying a display capability of the display device, and the source video format and the display video format are three-dimensional (3D) video formats different from each other;
   wherein the storage control device comprises:
   a second storage device, coupled to the video decoder, for buffering the first video input generated from the video decoder; and
   a storage address re-mapping device, coupled between the first storage device and the second storage device, for re-mapping storage addresses of the first video input buffered in the second storage device to the first storage device and accordingly storing the second video input in the first storage device, wherein the first video input in the second storage device is stored into the first storage device at re-mapped storage addresses to serve as the second video input.

2. A video processing method, comprising:
   decoding an encoded video input to generate a first video input with a source video format;
   generating a second video input with a display video format to a first storage device according to the first video input with the source video format; and
   outputting a video output to a display device according to the second video input buffered in the first storage device, wherein the video output has the display video format satisfying a display capability of the display device, and the source video format and the display video format are three-dimensional (3D) video formats different from each other;

wherein generating the second video input with the display video format to the first storage device comprises:
buffering the first video input generated from the video decoder in a second storage device; and
re-mapping storage addresses of the first video input buffered in the second storage device to the first storage device and accordingly storing the second video input in the first storage device, wherein the first video input in the second storage device is stored into the first storage device at re-mapped storage addresses to serve as the second video input.

* * * * *